United States Patent
Voldman et al.

(10) Patent No.: US 7,085,306 B1
(45) Date of Patent: Aug. 1, 2006

(54) SYSTEM AND METHOD FOR A MULTI-FREQUENCY UPSTREAM CHANNEL IN A COMPUTER NETWORK

(75) Inventors: Mikhail Voldman, Northbrook, IL (US); Dan Budinger, Arlington Heights, IL (US); Ali Akgun, Chicago, IL (US); John G. Fijolek, Naperville, IL (US); Mark O. Vogel, Hampshire, IL (US); Kris Kelkar, Camarillo, CA (US)

(73) Assignee: 3Com Corporation, Marlborough, MA (US)

( * ) Notice: Subject to any disclaimer, the term of this patent is extended or adjusted under 35 U.S.C. 154(b) by 767 days.

(21) Appl. No.: 10/013,321

(22) Filed: Oct. 30, 2001
(Under 37 CFR 1.47)

(51) Int. Cl.
*H04B 1/713* (2006.01)
(52) U.S. Cl. .............. 375/132; 375/133; 370/431; 370/436; 370/341; 370/329
(58) Field of Classification Search ............ 375/132, 375/133; 370/431, 436, 438, 341, 329; 455/450
See application file for complete search history.

(56) References Cited

U.S. PATENT DOCUMENTS

| | | | |
|---|---|---|---|
| 4,644,533 A | 2/1987 | Braff et al. | 370/94 |
| 4,881,263 A | 11/1989 | Herbison et al. | 380/21 |
| 4,996,685 A | 2/1991 | Farese et al. | 370/58.1 |
| 5,014,234 A | 5/1991 | Edwards, Jr. | 364/900 |
| 5,138,712 A | 8/1992 | Corbin | 395/700 |
| 5,301,273 A | 4/1994 | Konishi | 395/200 |
| 5,347,304 A | 9/1994 | Moura et al. | 348/12 |
| 5,430,727 A | 7/1995 | Callon | 370/85.13 |
| 5,442,749 A | 8/1995 | Northcutt et al. | 395/200.09 |
| 5,488,412 A | 1/1996 | Majeti et al. | 348/10 |
| 5,489,897 A | 2/1996 | Inoue | 340/870.39 |
| 5,528,595 A | 6/1996 | Walsh et al. | 370/85.13 |
| 5,583,931 A | 12/1996 | Schneider et al. | 379/399 |
| 5,586,121 A | 12/1996 | Moura et al. | 370/404 |
| 5,598,410 A | 1/1997 | Stone | 370/469 |

(Continued)

FOREIGN PATENT DOCUMENTS

WO WO 00/67385 11/2000

OTHER PUBLICATIONS

Data-Over-Cable Service Interface Specifications DOCSIS 1.1 Radio Frequency Interface Specification SP-RFIv1.1-I03-991105.*

(Continued)

*Primary Examiner*—Jay K. Patel
*Assistant Examiner*—Juan Alberto Torres
(74) *Attorney, Agent, or Firm*—McDonnell Boehnen Hulbert & Berghoff

(57) ABSTRACT

System and method for providing a multi-frequency upstream transmission channel to a network device. When a headend network entity generates an upstream channel descriptor message, the descriptor message includes at least two upstream frequencies available for upstream transmission, and a frequency hopping descriptor with a frequency-hopping pattern associated with the available frequencies for determining an upstream frequency for upstream transmission. The headend provides a timing reference for determining upstream transmission periods on the frequencies available on the network device. When the headend receives upstream transmission on one of the available upstream frequencies, the headend network entity determines frequency distortions. If the distortions exceed a threshold level, the headend may send a new upstream channel descriptor message that excludes the upstream frequency associated with the high frequency distortions, add a new upstream frequency, or defines a new frequency-hopping pattern.

22 Claims, 11 Drawing Sheets

U.S. PATENT DOCUMENTS

| | | | |
|---|---|---|---|
| 5,600,717 A | 2/1997 | Schneider et al. | 379/399 |
| 5,606,606 A | 2/1997 | Schneider et al. | 379/399 |
| 5,608,446 A | 3/1997 | Carr et al. | 348/6 |
| 5,610,910 A | 3/1997 | Focsaneanu et al. | 370/351 |
| 5,623,542 A | 4/1997 | Schneider et al. | 379/399 |
| 5,623,601 A | 4/1997 | Vu | 395/187.01 |
| 5,636,211 A | 6/1997 | Newlin | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,870,391 A * | 2/1999 | Nago | 370/330 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,038,225 A * | 3/2000 | Nago | 370/343 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 709/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,400,751 B1 * | 6/2002 | Rodgers | 375/132 |
| 6,430,395 B1 * | 8/2002 | Arazi et al. | 455/41.2 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,581,092 B1 * | 6/2003 | Motoyama et al. | 709/219 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

OTHER PUBLICATIONS

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-37.

"Radio Frequency Interface Specification (Interim Specification) SP-RDIv1.1-I03-991105", MCNS Holdings, L.P., 1999, pp. 1i to 366.

"Cable Modem to Customer Premise Equipment Interface Specification (Interim) SP-CMCI-I02-980317" Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP-CMTS-NSII01-960702", MCNS Holdings, L.P., 1996, pp. ii to 13.

"Removable Security Module Interface Specifications (Interim Specification) SP-RSMI-I01-980204", MCNS Holdings, L.P., Cable Television Laboratories, Inc., 1997, pp. ii to 47.

"Baseline Privacy Interface Specification (Interim) SP-BPI-I01-970922", MCNS Holdings, L.P., 1997, pp. ii to 65.

"Operations Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Security System Specification (Interim Specification) SP-SSI-I01-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft-ietf-ipcdn-tri-mib-00.1.txt>," Mar. 1998, pp. 1 to 26.

Kyees, P.J. et al., *ADSL: A New Twisted-Pair Access to the Information Highway*, IEEE Communications Magazine, vol. 33, Issue 4, Apr. 1995, pp. 52-60.

Huang, Yin-Hwa et al., *Design of an MPEG-Based Set-Top Box for Video on Demand Services*, Acoustics, Speech, and Signal Processing, 1995, ICASSP-95., 1995 International Conference, vol. 4, ISBN: 0-7803-2431-5, May 9-12, 1995, pp. 2655-2658.

"A Solution for the Priority Queue Problem of Deadline-Ordered Service Disciplines," N.R. Figueira, IEEE International Conference on Computer Communications and Networks, Sep. 22-25, 1997, pp. 320-325.

"Radio Frequency Interface Specification (Interim Specification) SP-RFI-I04-980724", MCNS Holdings, L.P., 1997, pp. ii to 196.

"Radio Frequency Interface Specification (Interim Specification) SP-RFI-I05-991105", MCNS Holdings, L.P.,1999, pp. ii to 202.

"Radio Frequency Interface Specification (Interim Specification) SP-RFIv1.1-I06-001215", MCNS Holdings, L.P., 2000, pp. ii to 432.

\* cited by examiner

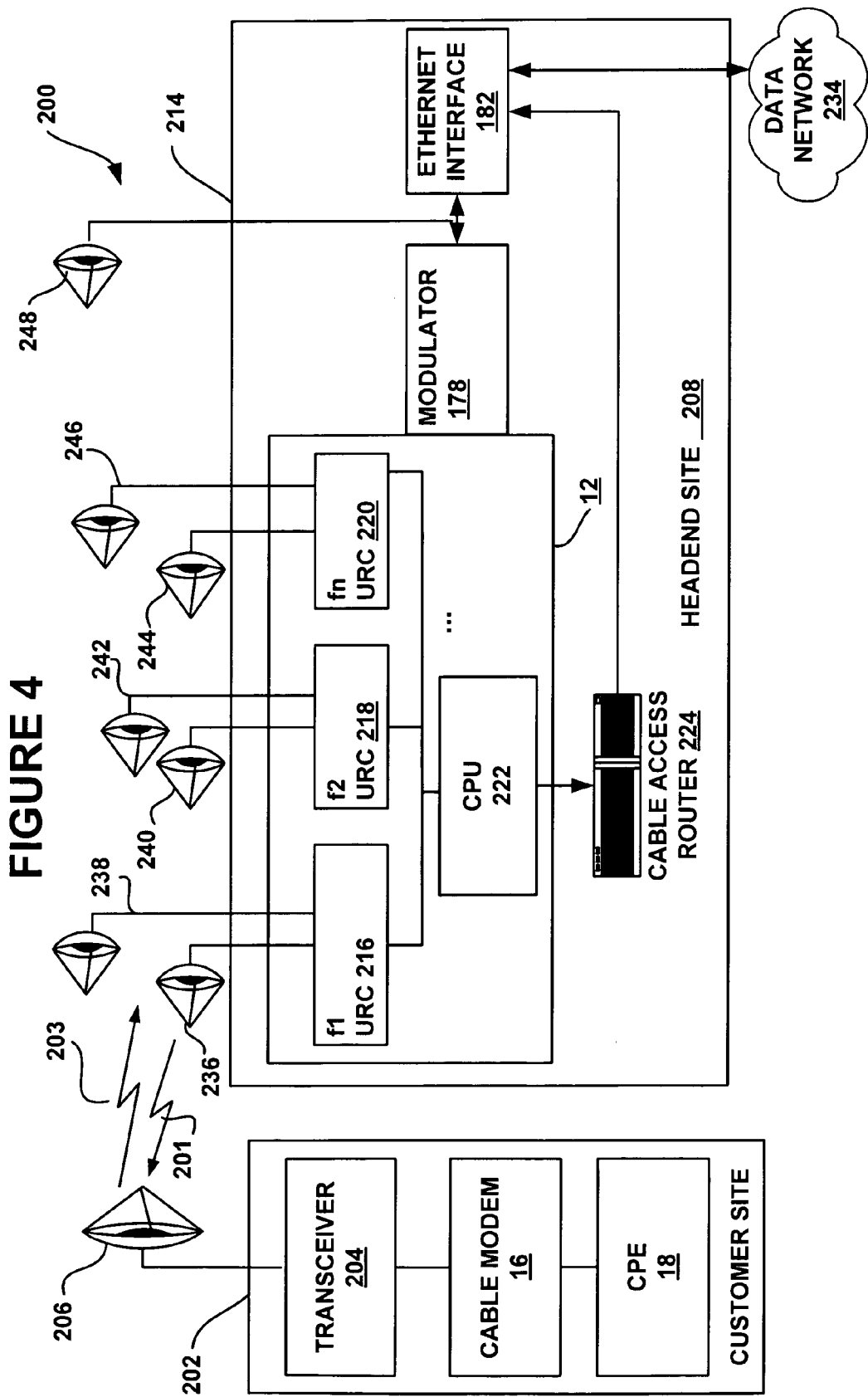

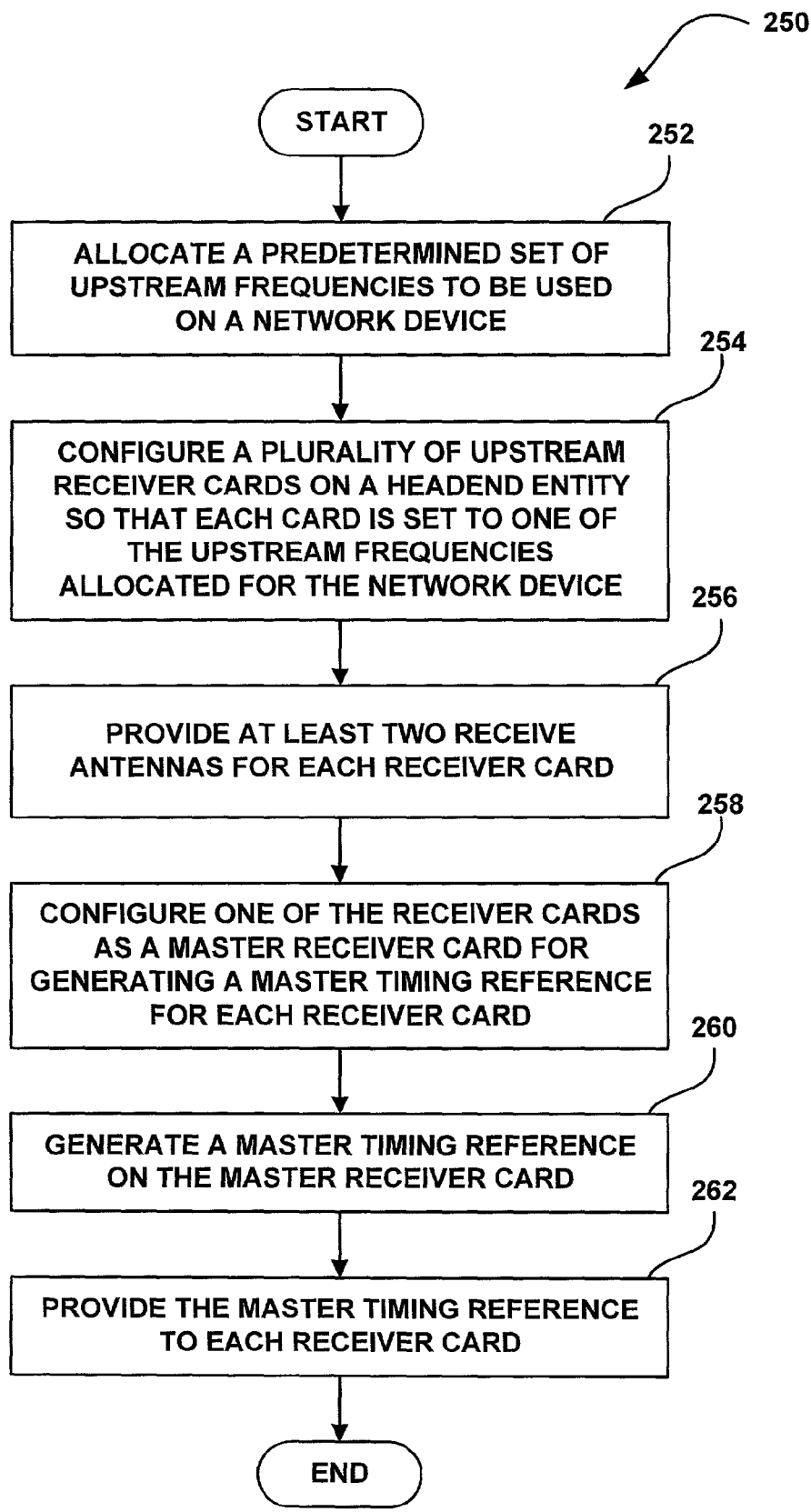

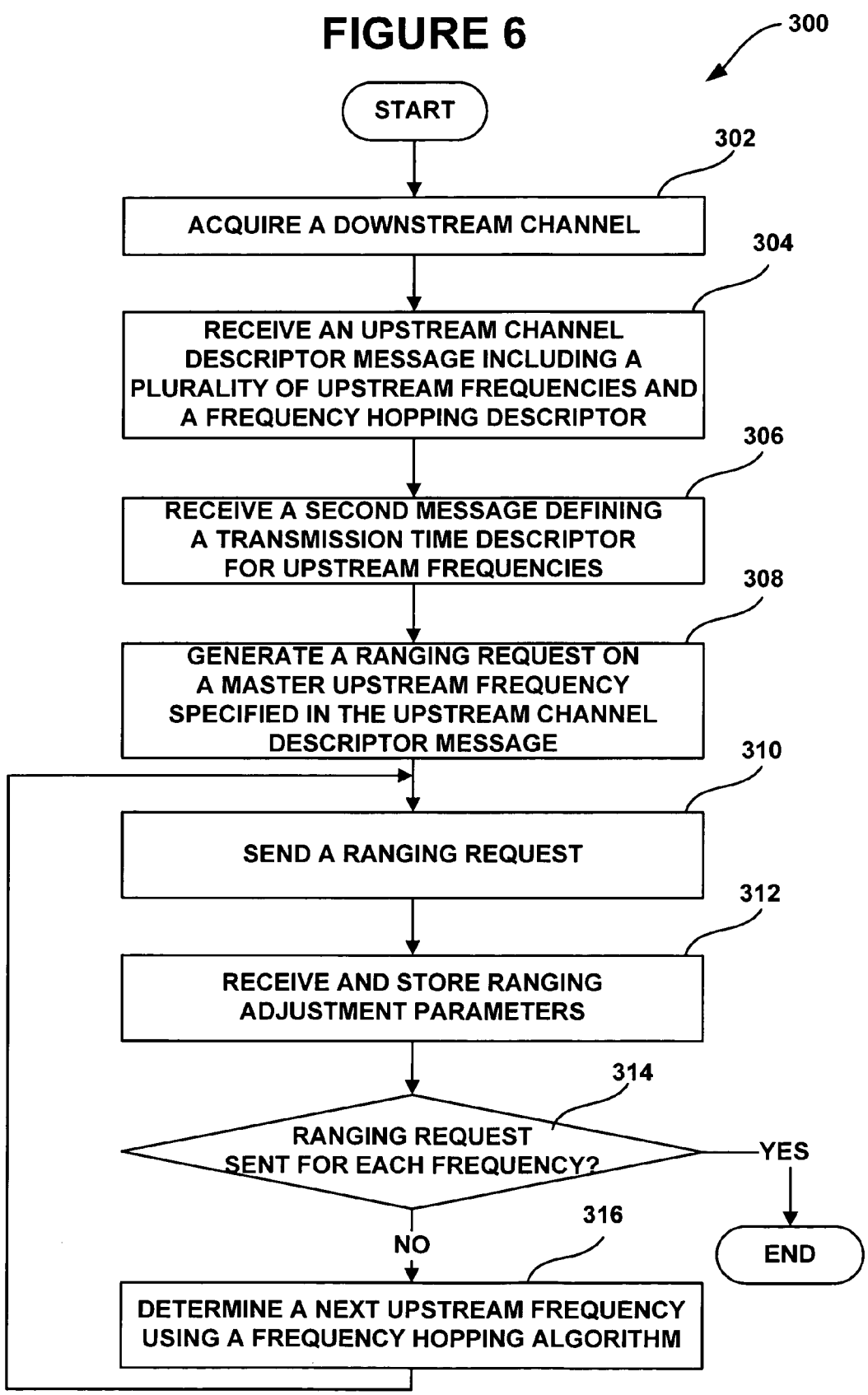

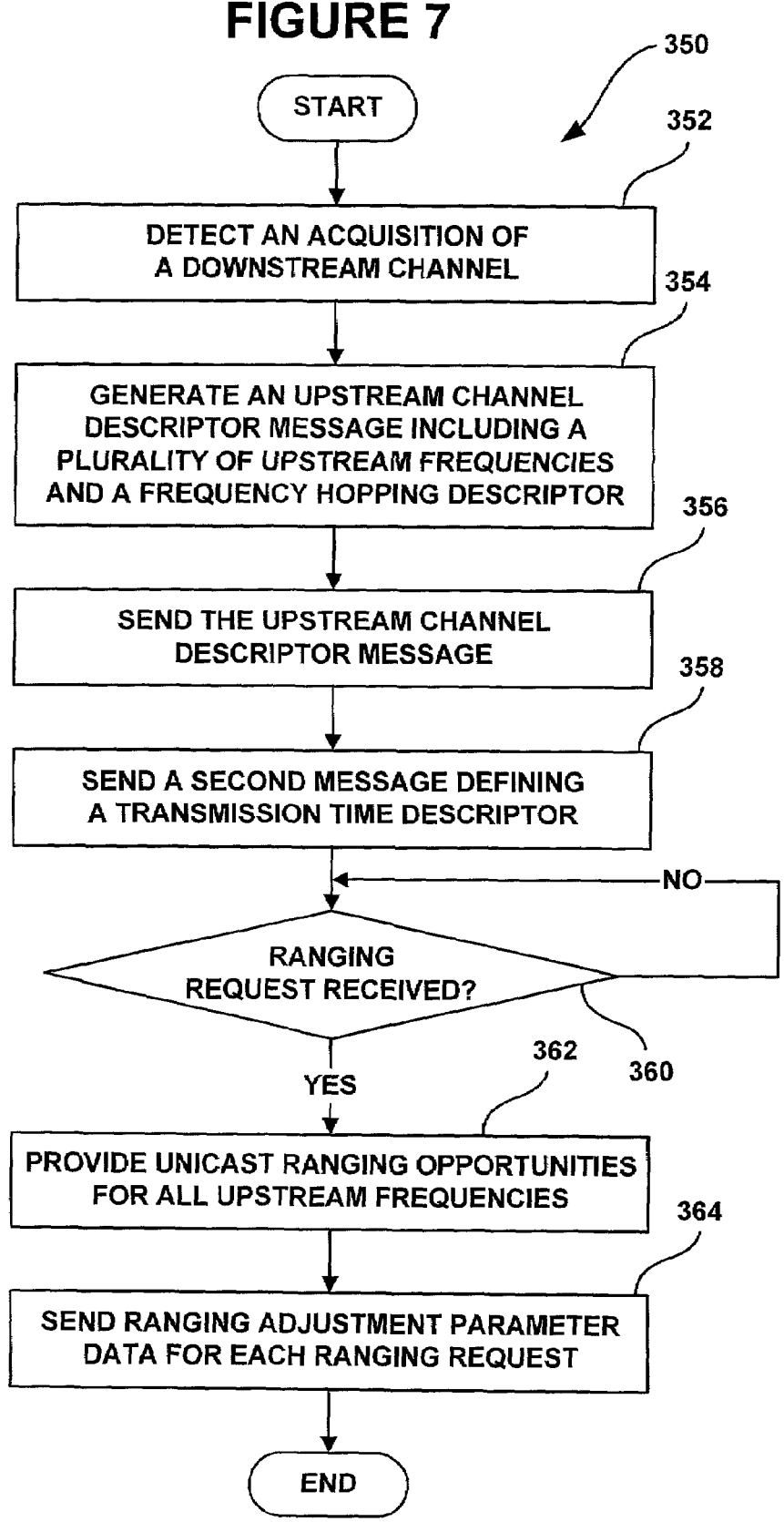

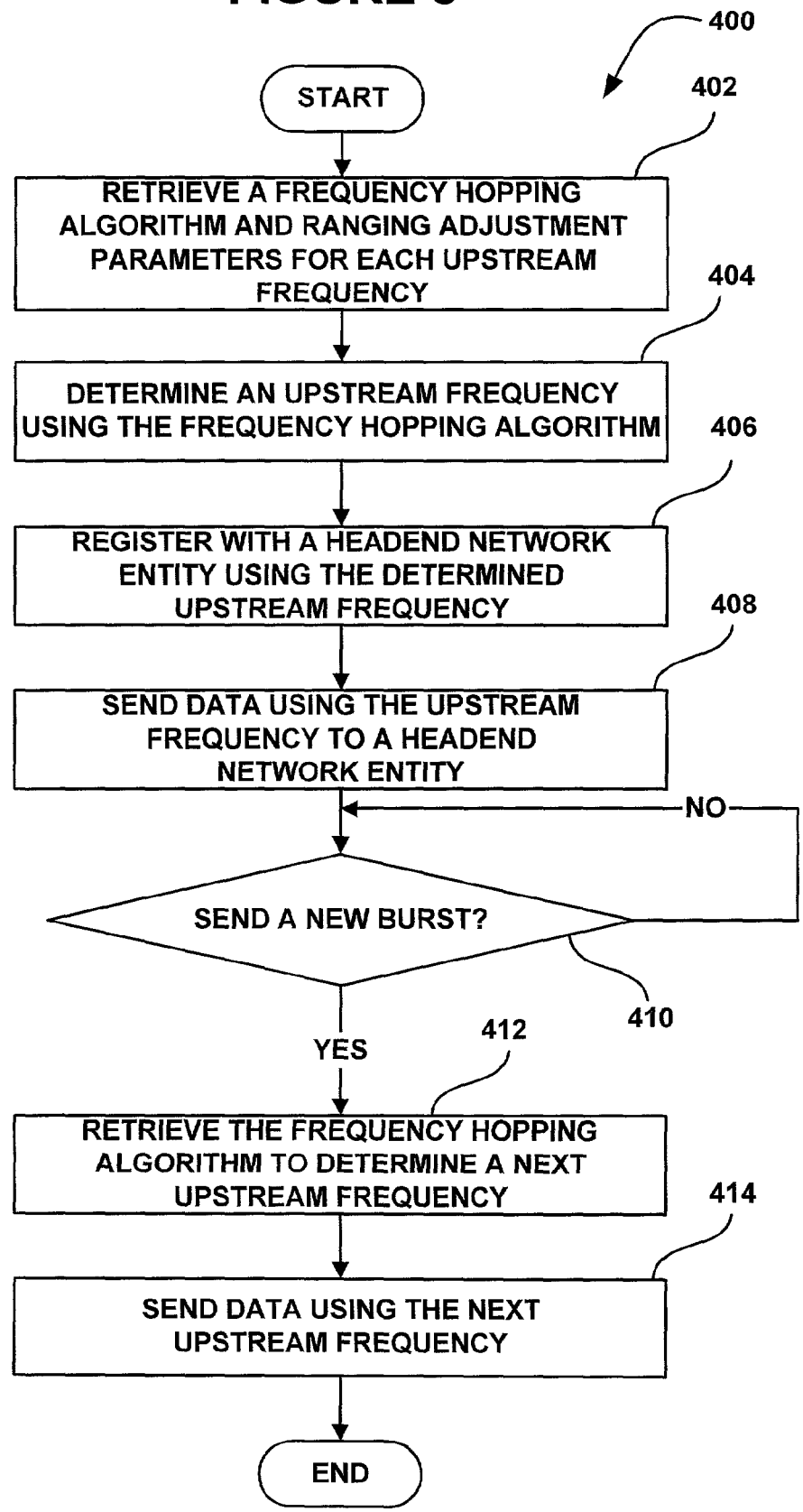

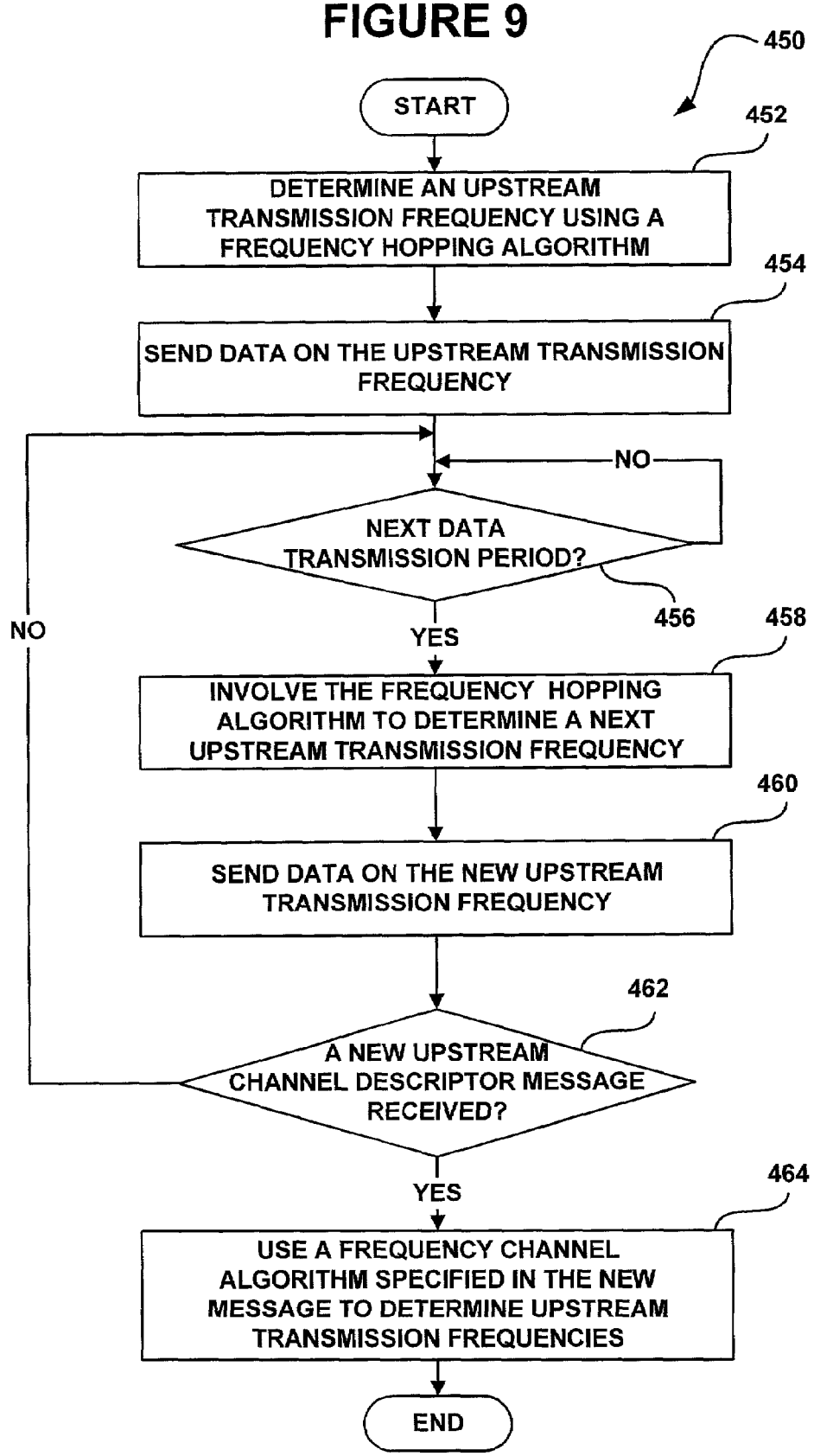

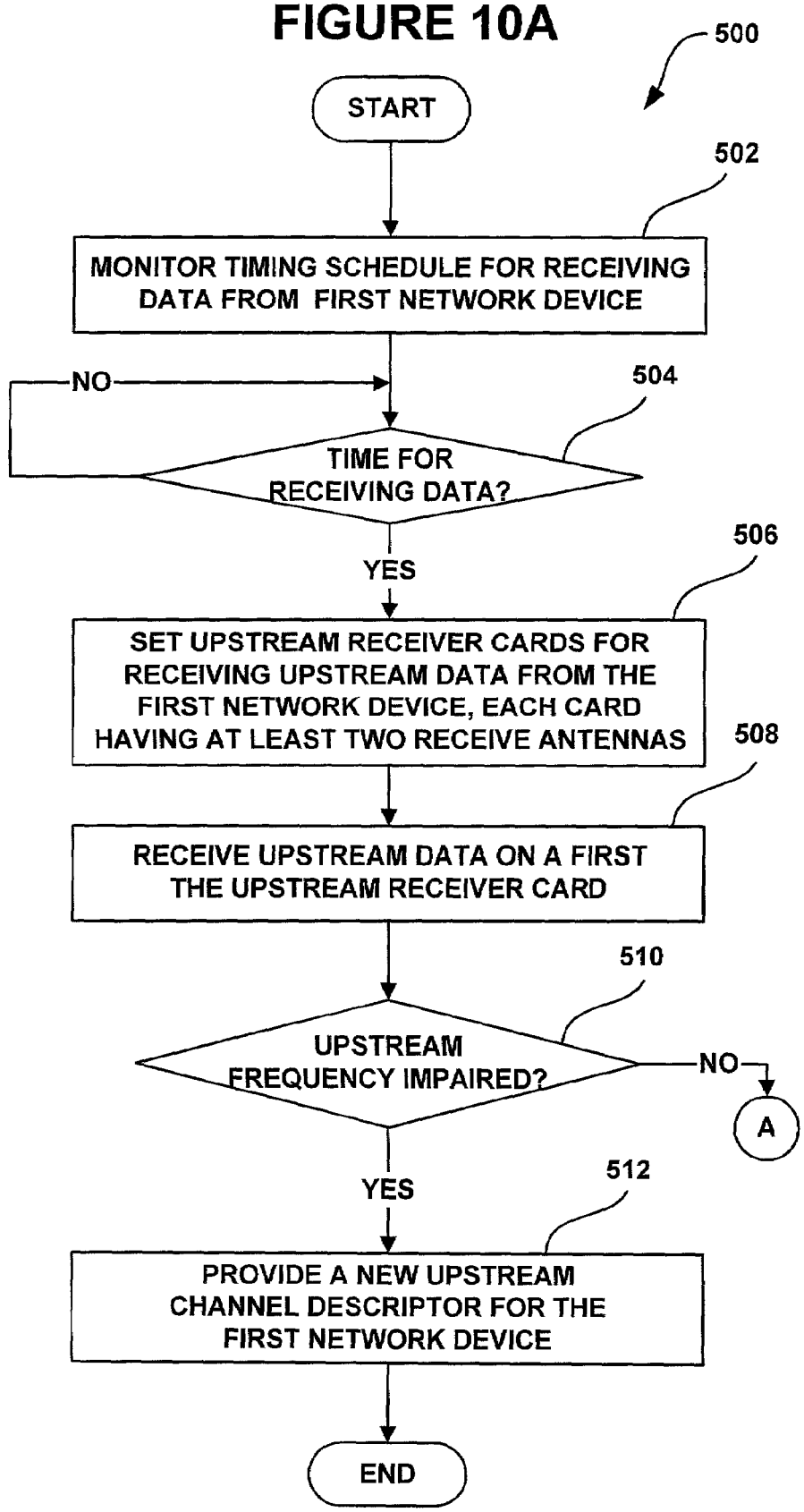

SYSTEM AND METHOD FOR A MULTI-FREQUENCY UPSTREAM CHANNEL IN A COMPUTER NETWORK

FIELD OF THE INVENTION

The present invention relates to communications in computer networks. More particularly, it relates to a method and a system for a more robust upstream path within a currently existing data-over-cable framework.

BACKGROUND OF THE INVENTION

Cable television networks such as those provided by Comcast Cable Communications, Inc., of Philadelphia, Pa., Cox Communications of Atlanta Ga., Time-Warner Cable, of Marietta Ga., Continental Cablevision, Inc., of Boston Mass., and others, provide cable television services to a large number of subscribers over a large geographical area. The cable television networks are typically interconnected by cables such as coaxial cables or a Hybrid Fiber/Coaxial ("HFC") cable system that have data rates of about 10 Mega-bits-per-second ("Mbps") to 30+ Mbps.

The Internet, a world-wide-network of interconnected computers, provides multi-media content including audio, video, graphics and text that require a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Cisco Corporation of San Jose, Calif., Scientific-Atlanta, of Norcross, Ga. and others offer customers higher-speed connectivity to the Internet, an intranet, Local Area Networks ("LANs") and other computer networks via cable television networks.

These cable modems currently support a data connection to the Internet and other computer networks via a cable television network with a data rate of up to 30+ Mbps, which is a much larger data rate than can be supported by a modem used over a serial telephone line.

Many cable television networks provide bi-directional cable systems, in which data is sent "downstream", from a "headend" to a customer, as well as "upstream", from the customer back to the headend. The cable system headend is a central location in the cable television network and, further, is responsible for sending cable signals in the downstream direction and receiving cable signals in the upstream direction. An exemplary data-over-cable system with RF return typically includes customer premises equipment, a cable modem, a cable modem termination system, a cable television network, and a data network such as the Internet.

Some cable television networks provide only uni-directional cable systems, supporting only a "downstream" data path, which provides a path for flow of data from a cable system headend to a customer. In such a system, a return data path, an upstream data path, may be provided via a telephone network, such as a public switched telephone network provided by AT&T and others. A cable television system with an upstream connection to a telephony network is typically called a "data-over-cable system with telephony return."

An exemplary data-over-cable system with a telephony return typically includes customer premise equipment ("CPE") entities (such as a customer computer or a Voice over Internet Protocol ("VoIP") device), a cable modem, a cable modem termination system, a cable television network, a public switched telephone network, a telephony remote access concentrator, and a data network (e.g., the Internet). The cable modem termination system and the telephony remote access concentrator combined are called a telephony return termination system.

If the customer premises equipment entity comprises a telephone or a device capable of sending and receiving video or voice signals, the cable modem has to be capable of sending and receiving such signals. In such cases the cable modem typically comprises an internal media terminal adapter, which provides a network interface functionality that accepts analog voice inputs or video signals and generates IP packets using the Real Time Transport protocol, for instance.

In a bi-directional cable system, when the cable modem termination system receives data packets from the data network, the cable modem termination system transmits received data packets downstream via the cable television network to a cable modem attached to the customer premises equipment entity. The customer premises equipment entity sends response data packets to the cable modem, which sends the response data packets upstream via the cable network. The cable modem termination system sends the response data packets back to the appropriate host on the data network.

As the popularity of the wireless communication increases, many data-over-cable system providers employ wireless transmission over traditional upstream and downstream paths. A wireless broadband modem service architecture, such as a Multichannel Multipoint Distribution Services ("MMDS") architecture, is a fixed wireless access solution being employed by service providers to offer broadband data and voice access to their customers. The wireless broadband architecture typically includes head-end equipment and reception equipment. The head-end equipment may include satellite signal reception equipment, radio transmitters, broadcast equipment, and a transmission antenna. The reception equipment at each subscriber location may include an antenna, a frequency conversion device and a set-top device. Signals for Multichannel Multipoint Distribution Services broadcast at the transmitter site originate from a variety of sources. Satellite, terrestrial and cable delivered programs, in addition to local baseband services, comprise the material to be delivered over the Multichannel Multipoint Distribution Services.

Typical data-over-cable systems operate according to a set of specifications, one of which is the Data-Over-Cable Service Interface Specification ("DOCSIS"), published by Cable Television Laboratories. The Data-Over-Cable Service Interface Specification is an IP centric point to multi-point standard that was developed for broadband Internet access applications over cable television networks. As such, the standard is designed to support existing and later developed IP based network services. The DOCSIS specification is an excellent resource when employed, for example, with network and data link protocols, Quality of Service, convergence, synchronization, registration, encryption, or privacy related implementations. However, because the DOC- SIS was designed for cable television systems, it is inadequate to address some unique characteristics and requirements of other types of systems such as the wireless system. In wireless systems, the upstream performance differs from a typical upstream path of a cable system. Some of the upstream performance characteristics of the upstream wireless channel include, for example, a limited carrier to noise ratio, an interference from co-channels and reused frequencies, a carrier frequency offset between a headend modulator and a customer premises entity demodulator, a fading receiving power level at the base station, or a high dynamic range at a base station receiver.

As is known in the art, employing the Orthogonal Frequency Division Multiplexing ("OFDM") modulation on downstream channels of a cable television system can enhance a downstream channel performance. The Orthogonal Frequency Division Multiplexing modulation splits a data stream into a plurality of radio frequency channels, each of which is sent over a subcarrier frequency, while a signal-to-noise ratio is monitored to ensure maximum performance. However, in order to match the performance of the OFDM downstream, the performance of an upstream path should be enhanced. One of the solutions that adds the frequency diversity on an upstream channel involves having antenna diversity on a client device. However, such an embodiment is not efficient and very expensive since having the antenna diversity on a client device can double the cost of this equipment in every home deployment.

Thus, it is desirable to develop standard, reliable, efficient, and preferably integrated into the existing cable modem infrastructure, systems and methods for adding robustness to an upstream and downstream path for a fixed wireless, cable or satellite system.

SUMMARY OF THE INVENTION

According to exemplary embodiment, systems and methods for providing a multi-frequency upstream transmission channel are developed.

A method for providing multi-frequency upstream transmission channel for a network device includes receiving a first message on the network device from a headend network entity including a plurality of upstream frequencies allocated for upstream transmission from the network device. In one embodiment, the first message further includes a frequency hopping descriptor defining a frequency hopping algorithm or a time pattern for using the upstream frequencies for upstream transmission from the network device. Responsive to receiving the first message, the network device determines a first frequency for upstream transmission by applying a predetermined frequency hoping algorithm or time pattern to the available frequencies specified in the first message. Subsequently, the network device employs the first frequency for upstream transmission. During the next upstream burst, the network device employs the frequency hopping algorithm or time pattern to determine a second upstream frequency. The method further includes receiving a second message on the first network device from the headend network entity including a new set of upstream frequencies or a new frequency hopping descriptor. In one embodiment, the network device may receive the second message from the headend network entity when the headend network entity detects frequency impairment on one or more upstream frequencies that were allocated for upstream transmission for the network device.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIG. 4 is a block diagram illustrating a second exemplary system having a multi-frequency upstream channel in a wireless network;

FIG. 5 is a flow chart illustrating a method for configuring upstream receivers associated with a headend network entity;

FIG. 6 is a flow chart illustrating a method for initializing a network device in a network system having a multi-frequency upstream channel;

FIG. 7 is a flow chart illustrating a method for providing configuration parameters for a network device in a network system having a multi-frequency upstream channel;

FIG. 8 is a flow chart illustrating a method for registering and sending data via a multi-frequency upstream channel from a network device;

FIG. 9 is a flow chart illustrating a method for changing upstream frequencies for upstream data transmission from a network device; and FIGS. 10A and 10B are a flow chart illustrating a method for managing a multi-frequency upstream transmission.

DETAILED DESCRIPTION OF AN EXEMPLARY EMBODIMENT

Exemplary Data-Over-Cable System

Figure 1:
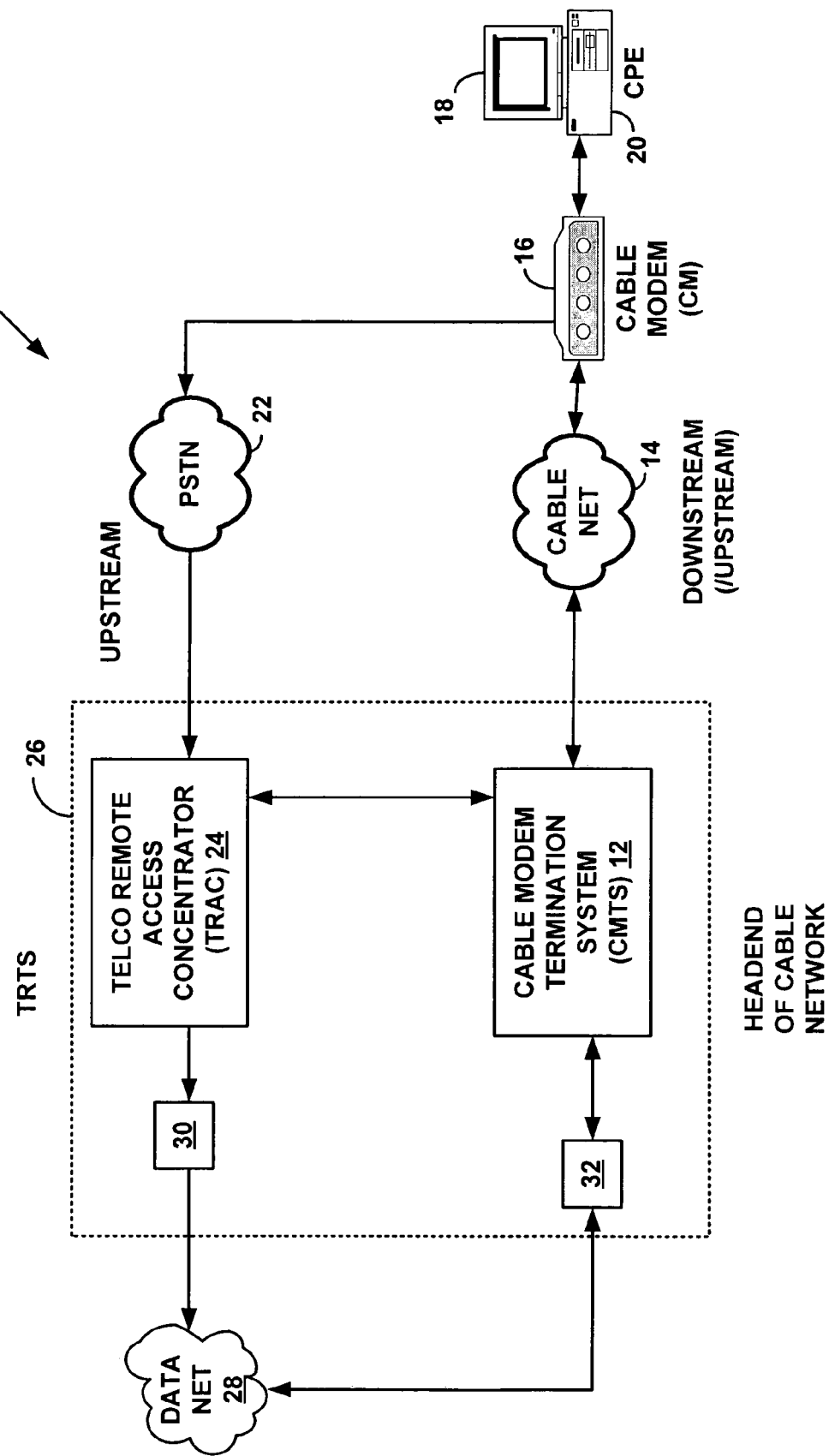
FIG. 1 is a block diagram illustrating a cable modem system in which exemplary embodiments of the present invention may be applied.

FIG. 1 is a block diagram illustrating an exemplary data-over-cable system 10. The data-over-cable system 10 may be a bi-directional cable system supporting a downstream data flow and an upstream data flow to and from a cable television network "headend" from and to a customer premises equipment entity such as a personal computer, for instance. The cable television network "headend" is a central location responsible for sending cable signals in a downstream and an upstream direction. In a bi-directional cable system, customer premises equipment entities or a cable modem may have an upstream connection to a cable modem termination system via a cable television connection, a wireless connection, a satellite connection or a different connection by which the cable modem may send data upstream to the cable modem termination system.

Alternatively, the data-over-cable system 10 may be a uni-directional cable system supporting only a downstream data path from a cable television network headend to a customer premises equipment entity, such as a personal computer. In the uni-directional cable system, a return path is typically established via a telephone network ("telephone return"), which provides an "upstream" data path from the customer premises equipment back to the cable television network "headend". In a uni-directional cable system, a cable modem may comprise an integral telephone modem for connecting to a Public Switched Telephone Network ("PSTN") such as a PSTN 22, and the integral telephone modem may be connected to the cable modem for exchanging data.

The data-over-cable system 10 includes a Cable Modem Termination System ("CMTS") 12 connected to a cable television network 14, hereinafter a cable network 14. FIG. 1 illustrates one CMTS 12. However, the data-over-cable system 10 may include multiple CMTS 12. Further, according to an exemplary embodiment, the CMTS 12 and any other network entities that will be described in the following paragraphs may be duplicated in a serial or a parallel arrangement to provide a back-up in case of failure.

In the exemplary embodiment of the present invention, the CMTS 12 may be a Total Control hub by 3Com Corporation of Santa Clara, Calif., with a cable modem termination unit. A Total Control hub is a chassis with multiple networking cards connected by a common bus. However, the CMTS 12 could also be another network server such as a network server by Cisco Systems of San Jose, Calif., for instance.

The cable network 14 may be a cable television network such as one provided by Comcast Cable Communications, Inc., of Philadelphia, Pa., Cox Communications of Atlanta, Ga., or Time-Warner Cable, of Marietta, Ga., for instance.

A cable modem ("CM") 16 is connected to the cable network 14 with a downstream cable connection. The cable modem may be provided by 3Com Corporation of Santa Clara, Calif., or Motorola Corporation of Arlington Heights, Ill., for instance.

In the exemplary embodiment, the data-over-cable system 10 operates according to a set of specifications, one of which is the Data Over Cable Service Interface Specification ("DOCSIS"), published by Cable Television Laboratories. As known in the art, the DOCSIS specification defines interface requirements for cable modems involved in a high speed data distribution over cable television networks. Further, the data-over-cable system 10 may be Packet Cable specifications compliant. The Packet Cable specifications define mechanisms required for supporting voice and video transmission over cable systems. If the data-over-cable system 10 is Packet Cable specification compliant, the CM 16 may comprise an internal media terminal adapter, or a media terminal adapter may otherwise be provided in communications with the CM 16. The media terminal adapter may provide a network interface functionality for transmitting voice or video signals and for converting analog voice inputs or video signals to IP packets using, for instance, the Real Time Transport protocol.

Furthermore, if the data-over-cable system 10 is Packet Cable Specification compliant, the data-over-cable system 10 may include a plurality of additional network devices such as a call management server and a gate controller, for instance. The call management server may enable the media terminal adapter to establish multimedia sessions including voice communications applications such as "IP telephony" or "VoIP". The gate controller may be used to perform authorization and authentication checks for users attempting to connect to the CMTS 12.

FIG. 1 illustrates one CM 16 connected to the CMTS 12. However, typical data-over-cable systems include tens or hundreds of thousands of CMs 16 connected to the CMTS 12. In addition, as shown in FIG. 1, the CM 16 is connected to a CPE entity 18 such as a personal computer system, a VoIP device or a telephone, for instance. The CM 16 may be connected to the CPE entity 18 via a Cable Modem-to-CPE Interface ("CMCI") 20. FIG. 1 illustrates one CPE entity 18. However the CM 16 is typically coupled to multiple CPE entities.

If the data-over-cable system 10 is a bi-directional data-over-cable system, the CM 16 may have an upstream and downstream connection to the CMTS 12 via a cable television connection, a wireless connection or a satellite connection, for instance. FIG. 1 illustrates an exemplary upstream and downstream connection to the CMTS 12 via the cable network 14. In such embodiment, the CMTS 12 may still also provide data from the PSTN 22 to the CM 16 or the CPE entity 18.

In a downstream direction of a bi-directional data-over-cable system, a cable system typically has a passband with a lower edge between 50 MHz and 54 MHz and an upper edge between 300 MHz to 864 MHz. However, the data-over-cable system 10 is not limited to such frequencies, and frequencies in data-over-cable system may be implementation dependent. In the upstream direction, the cable system may have an operating frequency passband range from 5 MHz to 30 MHz or 5 MHz to 40 MHz, for instance.

As mentioned above, the cable system 10 may be a unidirectional cable system. In a unidirectional cable system, the CM 16 is connected to the PSTN 22 or other such network, which provides an upstream telephone connection. The upstream telephone connection may be a standard telephone line connection such as an Integrated Services Digital Network ("ISDN") connection or an Asymmetric Digital Subscriber Line ("ADSL") connection, for instance.

In that arrangement, the PSTN 22 may be connected to a Telephone Remote Access Concentrator ("TRAC") 24. In the data-over-cable system having an upstream telephone connection, the TRAC 24 may be a Total Control telephone hub by 3Com Corporation of Santa Clara, for instance. However, the TRAC 24 could also be a telephone hub manufactured by a different company, or could take still other forms.

The combination of the CMTS 12 and the TRAC 24 is called a "Telephone Return Termination System" ("TRTS") 26. The TRTS 26 is illustrated as a dashed box in FIG. 1. The CMTS 12 and the TRAC 24 may be at a "headend" of the cable system 10. Alternatively, for instance, the TRAC 24 may be located in a different location and may have routing associations with the CMTS 12. The cable system 10 may also include a plurality of servers such as operations servers, administrative servers or maintenance servers (not shown). Further, the CMTS 12 may connect a plurality of access points to the data-over-cable system 10. Additionally, the plurality of access points may be connected to cable headend access points. Such configurations may be "one-to-one", "one-to-many", or "many-to-many", and may be interconnected to other Local Area Networks ("LANs") or Wide Area Networks ("WANs").

The data-over-cable system 10 may comprise a plurality of network interfaces. As shown in FIG. 1, the TRAC 24 is connected to a data network 28 (e.g. the Internet, an intranet, a LAN or a WAN, for instance) via a TRAC-Network System Interface 30 ("TRAC-NSI"). The CMTS 12 is connected to the data network 28 via a CMTS-Network System Interface ("CMTS-NSI") 32.

Further, the data-over-cable system 10 may comprise a policy/authorization server in communication with the CMTS 12. The authorization/policy server may manage overall policies with an administrative domain such as an Internet service provider, for instance. The CMTS 12 may also comprise an internal authorization module that may serve as a policy enforcement point, for instance.

The system 10 may also comprise a bandwidth manager in communication with the CMTS 12. The bandwidth manager may detect network trends, measure network response time, generate Class of Service ("CoS") and QoS reports, allocate bandwidth and/or keep records of allocated and available bandwidth.

The exemplary system 10 in FIG. 1 is not limited to the shown network devices, and more, fewer or different components, connections and interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, in any suitable combination and location.

Further, as mentioned above, network entities in the data-over-cable system 10 may be duplicated to provide a back-up in case of failure of one or more network entities. For instance, the network entities may be duplicated in parallel or in series. In a parallel arrangement, for instance, the CMTS 12 comprising an internal authorization/policy server and an internal bandwidth manager may be duplicated. The CMTS 12 and a duplicated CMTS 12' (not shown) may operate simultaneously, with one of them active and the other one in a "standby" state. In such an arrangement, the two units may communicate using a "keep alive" signal, for instance. Thus, if the primary CMTS 12 fails, the redundant CMTS 12' may immediately start operating, and, ideally, there is no loss of service.

In another exemplary embodiment providing a back-up system, redundant units may operate in a serial manner. In the serial arrangement, units may be cross-connected with a heart-beat controlled shunt on ports. Further, in the serial arrangement, both units may be active, as opposed to a primary device being in an active state and a redundant device being in a standby state, as in the parallel arrangement. In another exemplary embodiment of the present invention, any individual integral components or groups of components may be duplicated.

An operating environment for each CMTS 12, CM 16, CPE 18, TRAC 24 and other network entities of an exemplary embodiment may include a processing system with at least one high speed processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions could be referred to as being "computer-executed", "processing unit executed", or the like.

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations may be physical locations that could have particular electrical, magnetic, optical, or organic properties for maintaining data bits.

The data bits may also be maintained on a computer readable medium such as magnetic disks, optical disks, organic disks, and any other volatile or non-volatile mass storage system readable by the processing unit, for instance. The computer readable medium may include cooperating or interconnected computer readable media, which may exist exclusively on the processing system or may be distributed among multiple interconnected processing systems that may be local or remote to the processing system.

Network Device Protocol Stack

Figure 2:
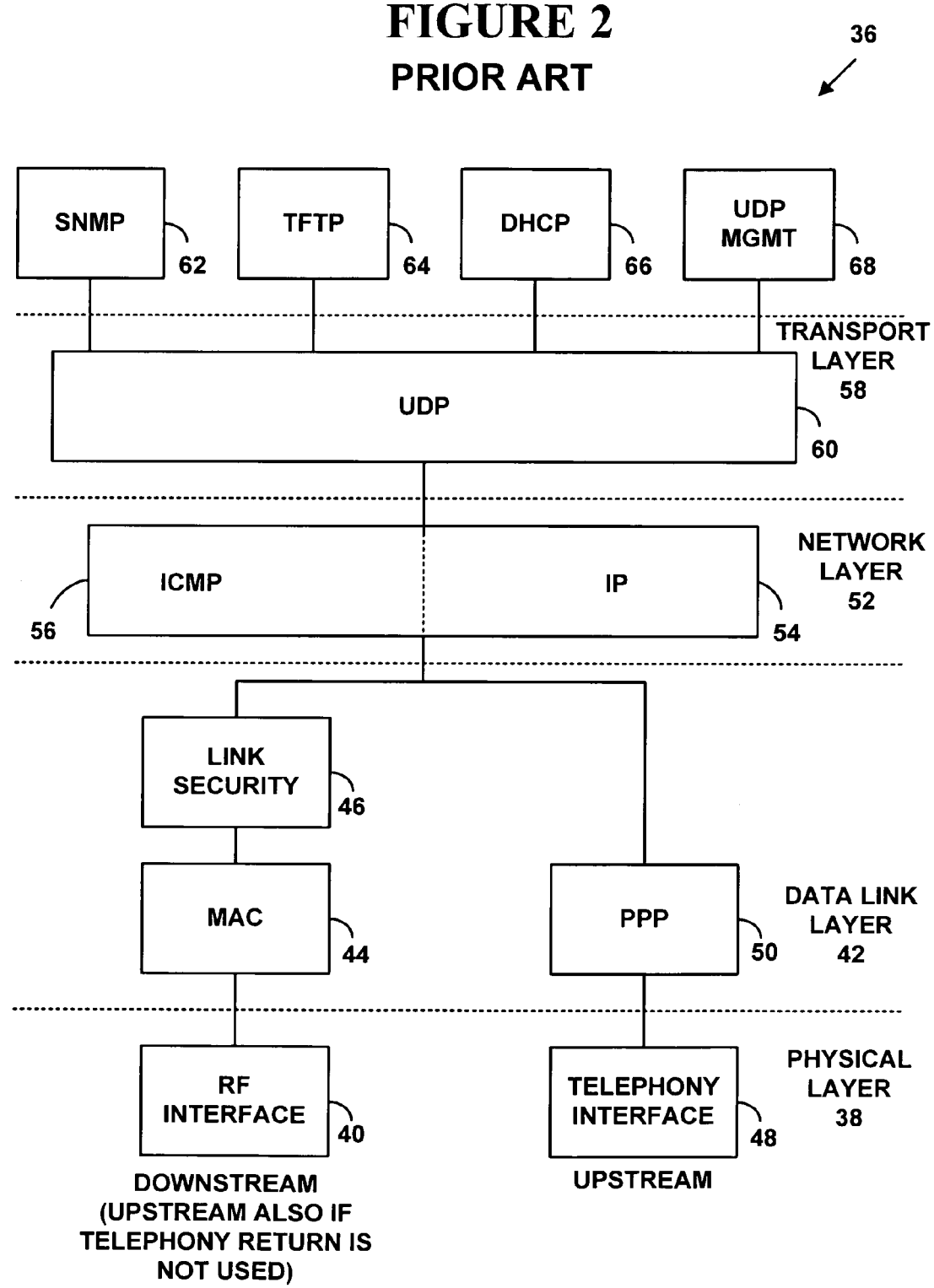
FIG. 2 is a block diagram illustrating a protocol stack for a data-over-cable system.

FIG. 2 is a block diagram illustrating an exemplary protocol stack 36 for network devices in the data-over-cable system 10. In an exemplary embodiment of the present invention, network entities in the data-over-cable system 10 may be DOCSIS compliant. However, other standards may also be used, and the present invention is not limited to DOCSIS compliant network entities.

FIG. 2 illustrates downstream and upstream protocols used in the CM 16, for instance. As known in the art, the Open System Interconnection ("OSI") model may be used to describe computer networks. The OSI model consists of seven layers including, from lowest to highest, a physical layer, a data-link layer, a network layer, a transport layer, a session layer, a presentation layer and an application layer. The physical layer transmits bits over a communication link. The data-link layer transmits error free frames of data. The network layer transmits and routes data packets.

In bi-directional data-over cable systems, the CM 16 is connected to the cable network 14 in a physical layer 38 via a Radio Frequency ("RF") Interface 40. In an exemplary embodiment of the present invention, for a downstream data transmission, the RF Interface 40 may have an operation frequency range of 50 Mega-Hertz ("MHz") to 1 Giga-Hertz ("GHz") and a channel bandwidth of about 6 to 8 MHz. However, other operation frequencies may also be used, and the invention is not limited to these frequencies. For an upstream transmission the RF Interface 40 may have an operation frequency range of about 5 MHz to 50 MHz. Further, the RF Interface 40 may use a signal modulation method, such as Quadrature Amplitude Modulation ("QAM"). As known in the art, the QAM is used as means for encoding digital information over radio, wire, or fiber optic transmission links. The QAM is a combination of amplitude and phase modulation and is an extension of a multiphase phase-shift-keying. The QAM may have any number of discrete digital levels typically including 4, 16, 64 or 256 levels. In an exemplary embodiment, QAM-64 may be used in the RF Interface 40. However, other operating frequencies and modulation methods could also be used, such as a Quadrature Phase Shift Keying ("QPSK") modulation, for instance. Further, the RF Interface 40 can also be used in a cable system with a telephone return.

In a data-over-cable system with a telephone return employed for an upstream connection, the CM 16 may be connected to the PSTN 22 in the physical layer via a telephone interface 48. In an exemplary embodiment, the telephony interface may operate in accordance with one of the standards of the International Telecommunications Union-Telecommunication ("ITU-T") Standardization Sector. The telephone interface 48 may use the ITU-T V.90 standard, for instance. As known in the art, the ITU-T V.90 standard is commonly used in a data link layer of modem communications, and it currently allows data rates as high as 55,600 bits-per-second ("bps"). However, the telephone interface 48 may also operate according to other communications standards, such as V.32 standard, V.34 standard or V.

90 standard, for instance. Further, the telephone interface 48 could also be an Asymmetric Subscriber Link ("ADSL") interface, an Integrated Services Digital Network ("ISDN") interface or a wireless interface, for instance.

Above the RF Interface 40, there is a data link layer comprising a Medium Access Control ("MAC") layer 44. As known in the art, the MAC layer 44 controls access to a transmission medium via the physical layer 38. The MAC layer 44 may use a protocol described in IEEE 802. However, other MAC layer protocols could also be used, such MCNS MAC layer protocol, for instance. Above the MAC layer 44 may be a link security protocol stack 46. The link security protocol stack 46 prevents unauthorized users from making a data connection from cable network 14.

A Point-to-Point Protocol ("PPP") layer 50 is in the data link layer 42 and above the telephone interface 48. As known in the art, the PPP layer encapsulates network layer datagrams over a serial communication link.

A network layer 52 is above both the downstream protocol layer and the upstream protocol layer. The network layer 52 comprises an Internet Protocol ("IP") layer 54 and an Internet Control Message Protocol ("ICMP") layer 56. The IP layer 54 corresponds to the OSI layer 3, which is the network layer, but, typically, is not defined as part of the OSI model. As known in the art, IP is a routing protocol designed to route traffic within a network or between networks. The ICMP layer 56 is used for network management. The ICMP provides a plurality of functions, such as error reporting, reachability testing (e.g., "pinging"), congestion control, route-change notification and performance or subnet addressing, for instance.

A transport layer 58 is above the network layer 52. The transport layer 60 comprises a User Datagram Protocol ("UDP") layer 60, which approximately corresponds to the OSI layer 4, the transport layer. As known in the art, UDP provides a connectionless mode of communications with datagrams. However, the transmission layer 58 is not limited to the User Datagram Protocol and other protocols, such as a Transmission Control Protocol ("TCP"), for instance.

Above the transport layer 58, there are a Simple Network Management Protocol ("SNMP") layer 60, a Trivial File Transfer Protocol ("TFTP") layer, a Dynamic Host Configuration Protocol ("DHCP") layer 66 and a UDP manager 68. The SNMP layer 60 is used to support network management functions. The TFTP layer 64 is a file transfer protocol, which is typically used to download files and configuration information. The DHCP layer 66 is a protocol for passing configuration information to host on the IP network 54. The UDP manager 68 distinguishes and routes packets to an appropriate service. However, more, fewer, or different protocol layers could be used in the data-over-cable system 10.

According to an exemplary embodiment of the present invention, the CM 16 may support transmission and reception of IP datagrams as specified by RFC-791. The CM 16 may be also configured to filter IP datagrams with IP addresses assigned to the CM 16 or CPE 18. Further, the CMTS 12 and the TRAC 24 may also perform filtering of IP datagrams.

During the initialization of the CM 16, the CMTS 12 transmits to the CM 16 a Termination System Information ("TSI") message, which is a MAC management message. The CMTS 12 may use the TSI message to report to the CM 16 whether or not a bi-directional system is used, for instance. Further, the TSI message may be used to provide the CM 16 with information about the status of the CMTS 12.

During the initialization process, the CM 16 may initiate a Dynamic Host Configuration Protocol ("DHCP") process. The DHCP process is used to provide configuration parameters to hosts on a network such as an IP network, for instance. The DHCP process provides two main services to network clients such as CMs or CPE entities. First it allocates IP network addresses to clients and, second, the DHCP process provides configuration parameters for network entities.

An exemplary DHCP message structure may be based on a format of BOOTstrap Protocol ("BOOTP") messages described in RFC-951 and RFC-1542, incorporated herein by reference. From a network host client's point of view, the DHCP is an extension of a BOOTP mechanism. This property allows the existing BOOTP clients to communicate with DHCP servers without requiring any changes in to network host clients' BOOTP initialization software.

To capture a BOOTP relay agent behavior described as part of the BOOTP specification and to allow interoperability of existing BOOTP clients with the DHCP servers, a DHCP server uses a BOOTP message format. Further, using the BOOTP relay agents eliminates the necessity of using a DHCP server on each physical network segment.

DHCP message structure includes an operation code field ("op"), a hardware address type field ("htype"), a hardware address length field ("hlen"), a number of hops field ("hops"), a transaction identifier field ("xid"), a seconds elapsed time field ("secs"), a flags field ("flags"), a client IP address field ("ciaddr"), a your IP address field ("yiaddr"), a server IP address field ("siaddr"), a gateway/relay agent IP address field ("giaddr"), a client hardware address field ("chaddr"), an optional server name field ("sname"), a boot file name ("file") and an optional parameters field ("options"). Descriptions for an exemplary DHCP message fields are shown in Table 1.

TABLE 1

| DHCP Parameter | Description |
| --- | --- |
| OP | Message op code / message type. 1 = BOOTREQUEST, 2 = BOOTREPLY. |
| HTYPE | Hardware address type (e.g., '1' = 10 Mps Ethernet). |
| HLEN | Hardware address length (e.g. '6' for 10 Mbps Ethernet). |
| HOPS | Client sets to zero, optionally used by relay-agents when booting via a relay-agent. |
| XID | Transaction ID, a random number chosen by the client, used by the client and server to associate messages and responses between a client and a server. |
| SECS | Filled in by client, seconds elapsed since client started trying to boot. |
| FLAGS | Flags including a BROADCAST bit. |
| CIADDR | Client IP address; filled in by client in DHCPREQUEST if verifying previously allocated configuration parameters. |
| YIADDR | 'Your'(client) IP address. |
| SIADDR | IP 54 address of next server to use in bootstrap; returned in DHCPOFFER, DHCPACK and DHCPNAK by server. |
| GIADDR | Gateway relay agent IP 54 address, used in booting via a relay-agent. |
| CHADDR | Client hardware address (e.g., MAC layer 44 address). |
| SNAME | Optional server host name, null terminated string. |
| FILE | Boot file name, terminated by a null string. |
| OPTIONS | Optional parameters. |

The DHCP message structure may be used to discover IP network host interfaces in data-over-cable system 10. A network host client such as the CM 16 may use the DHCP process to dynamically acquire or verify an IP address and network parameters whenever the network parameters may have changed. During a typical use of a DHCP process, the CM 16 and CPE 18 broadcast a "DHCPDISCOVER" message to receive configuration settings such as a configuration file and an IP address for the CM 16 and an IP address for the CPE 18. During the DHCP process, the DHCP servers may respond with DHCPOFFER messages including configuration parameters. Then, the CM 16 or the CPE 18 selects one of the DHCP servers and sends a DHCPREQUEST to the selected server. Upon a receipt of the DHCPREQUEST message on the selected server, the server may generate a DHCPOFFER message including a configuration file name for the CM 16 and an IP address assigned to the CM 16. Once the CM 16 receives the configuration file name from the selected server, the CM 16 may initiate a TFTP exchange process to request a configuration file from a TFTP server associated with the TFTP file name.

A Multi-Frequency Upstream Path in Fixed Wireless, Satellite, or Cable Plants

A fixed wireless broadband technology is emerging as a new access platform for delivery of high quality digital data, video and voice services. Similarly to cable providers, wireless operators are increasingly using their spectrum to offer high-speed Internet services. Just like a wired cable, a 6 MHz downstream wireless television channel can support 27 Mbps of downstream data using cable modems with 64 QAM technologies. Previously, a telephone return path or a cable path has been used for upstream communication, but operators are now transitioning to a full two-way wireless delivery.

There are several wireless spectrum blocks in the 2.1 to 2.7 GHz band that can be used for cable television and Internet services, including, among others, a multipoint distribution service ("MDS"), a multichannel multipoint distribution service ("MMDS"), and an instructional television fixed service ("ITFS"). Additionally, a wireless communications service ("WCS") spectrum allocated in 5 MHz and 10 MHz increments can be used for digital data and video transmission. The ultra-high frequency ("UHF") broadcast television spectrum technology can also potentially be used for a high-speed data access with cable modem technology, as can a local multipoint distribution service ("LMDS") spectrum, located in the super-high 27.5–29.5 GHz frequency range.

Similarly to the broadcast television, the MDS/MMDS/ITFS/LMDS transmission is based on the line-of-sight technology. Wireless cable signals are transmitted from a broadcast tower, usually located on a mountain or a tall building, to an antenna affixed to residence buildings or businesses through a local market. A reliable wireless service delivery requires a direct line of sight between the transmitter and the receiving antenna. As in the case with broadcast television, obstructions like dense tree cover, hills, tall buildings, or even heavy precipitation can influence the reception. Multipath distortions, which result from signal reflections off of buildings or other structures, can also cause problems.

Figure 3:
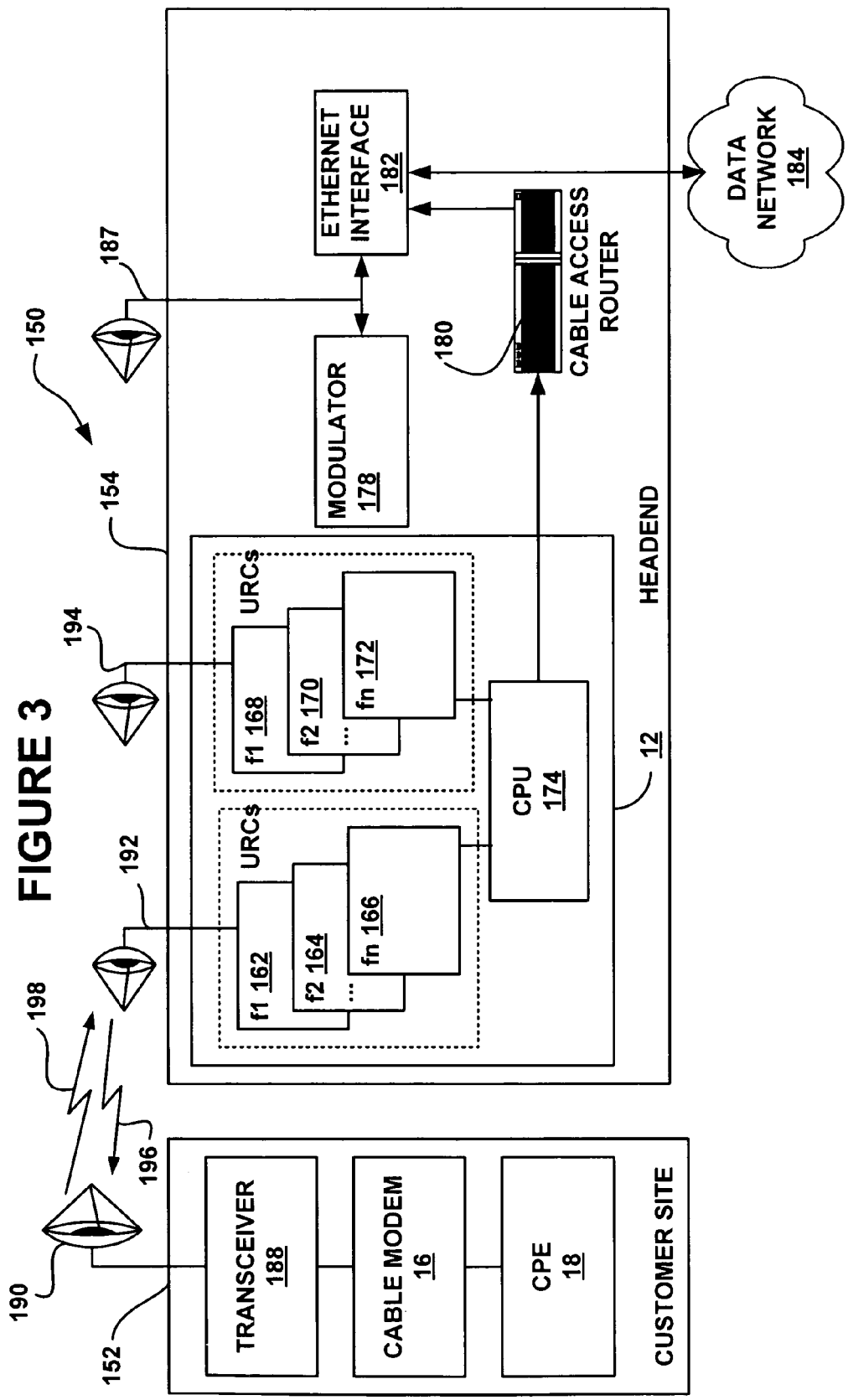
FIG. 3 is a block diagram illustrating an exemplary system having a multi-frequency upstream channel in a wireless network.

FIG. 3 is a block diagram illustrating an exemplary system 150 with a super upstream channel for a more robust downstream and upstream performance in a fixed wireless, cable or satellite plant with multipath distortions and signal reflections. Similarly to a wired cable data system, a customer site 152 includes the CPE 18 and the CM 16. Additionally, the customer site 152 includes a transceiver module 188 with one or more transmit/receive antennas 190 affixed, for example, to a customer's residence. In one embodiment, the customer site 152 may include two separate antennas for receiving and transmitting signals from a headend site 154. For example, the antennas 190 may include rectangular parabolic shaped antennas for receiving and transmitting vertically or horizontally polarized signals. However, the exemplary system 150 is not limited to the rectangular parabolic shaped antennas, and different types of antennas could also be used. The transceiver module 188 includes a combined down-converter and upconverter. Digital data signals, such as Internet content signals, are received from the headend site 154 via a wireless downstream communication link 196 on the antenna 190 at the subscriber site 152. Coaxial cable can be run from the antenna 190 to a downconverter in the transceiver module 188 that shifts the wireless band frequencies into the cable television frequency band, and then to the CM 16 inside the customer premise site 152. The CM 16 can then demodulate the incoming high-speed data signal and can pass it to an individual CPE 18 or a local area network ("LAN") through, for example, a 10Base Ethernet link.

In the exemplary system architecture 150, the headend site 154 includes two transverters two upstream receiver cards ("URCs") arrays 158 and 160, where each URC array is associated with at least one antenna receiving data transmitted from the customer site 152 via a wireless upstream communication link 198. As illustrated in FIG. 3, the URC array 158 is associated with an antenna 192, and the URC array 160 is associated with an antenna 194. Each array includes a plurality of URCs arranged to receive a plurality of upstream frequencies. FIG. 3 illustrates two URC arrays. However, it should be understood that more than two URC arrays could also be used, and the exemplary embodiment is not limited to any predetermined number of URC arrays.

As illustrated in FIG. 3, the URC arrays 158 and 160 include a plurality of URCs, shown as "n" URCs in each array, and the URCs in the two arrays are arranged to receive the same set of upstream frequencies transmitted from the customer site 152. According to an exemplary embodiment, the CMTS 12 provides a plurality of upstream frequencies to the CM 16 for upstream data transmission, and, based on the upstream frequencies provided to the CM 16, the CMTS 12 configures each URC. Specifically, the URCs associated with each array are arranged to receive the plurality of upstream frequencies available to the CM 16. Further, according to an exemplary embodiment, the CMTS 12 provides a frequency hopping descriptor associated with a predetermined frequency hopping algorithm or a frequency hopping pattern that is used on the CM 16 to hop between the available upstream transmission frequencies.

In one embodiment, customer premises transmission on one of the upstream frequencies available to the CM 16 is picked up at both antennas of the URC arrays, and the URCs that are arranged to receive that upstream frequency receive the customer premises transmission. Subsequently, the URCs compute errors and distortions associated with the received signals to determine a transmission path having fewer distortions. As mentioned in the proceeding paragraphs, the wireless service delivery requires a direct line of sight between a transmitter that is located, for example, at the customer site 152 and the receiving antenna such as the antennas 192 and 194 located at the headend 154. The obstructions on the way of the transmitted signals and multipath distortions resulted from the signals' reflections typically hinder the reception of signals transmitted from the CM 16 on one of the available upstream frequencies. However, according to an exemplary embodiment, the headend 154 includes two antennas connected to the URC arrays 158 and 160, and each URCs in every array is arranged to receive the signal transmitted on one of the upstream frequencies available to the CM 16. The signals received on one of the URCs of each URC array would differ based on different signal reflections and multipath distortions of signal paths to each antenna. Thus, according to one embodiment, each URC that receives the upstream frequency signal from the CM 16 computes an error value associated with the received signal caused by signal reflections and multipath distortions. Next, the error values computed on the URCs may be compared by a central processing unit ("CPU") 174 to determine an upstream transmission path having fewer multipath distortions, and the customer premises transmission associated with the upstream transmission path having fewer distortions is used for further processing.

Thus, since the URCs have the ability to choose between the signals received on two different antennas, reflections and fades may be managed in a more robust manner. Further, since there are two different antennas arranged to receive upstream frequency signals from the CM 16, the antenna 190 at the customer site 152 does not have to be highly directional, and more latitude in aiming the customer premise antenna 190 is allowed.

In addition to the antenna diversity, the availability of more than one upstream frequency to the CM 16 further enhances the upstream performance. In one embodiment, this is accomplished by configuring multiple URCs to receive a specific upstream frequency, and providing to the CM 16 a predetermined set of available upstream frequencies and a frequency-hopping algorithm, the methods of which will be described in greater detail below.

Further, as illustrated in FIG. 3, the headend 154 includes a cable access router 180 connected to upstream receiver arrays via a system bus. In one embodiment, the cable access router 180 may be connected to an Ethernet Interface Card 182 providing a network interface for bi-directional transmission to and from a data network 184. In the embodiment illustrated in FIG. 1, the data network may include an Internet network.

Data signals from the data network 184 are transmitted via the fast Ethernet interface 182 to a modulator 178. Once the signals are modulated, the signals are upconverted to downstream frequencies employed on the downstream transmission link 196 and are transmitted to the customer site 152. In one embodiment, the signals for the downstream transmission may be upconverted on the downstream modulator card 178. Further, the headend 154 may include satellite signal reception equipment for receiving and processing satellite delivered signal formats. In such an embodiment, all satellite delivered baseband formats are re-modulated and then upconverted to the frequencies used on the downstream communication link 196.

In one embodiment, the upstream communication link 198 and the downstream communication link 196 may utilize the microwave frequencies. For example, downstream and upstream directions may employ MMDS communication links, MDS communication links, WCS communication links, ITFS communication links, LMDS communication links, or other types of communication links. The MMDS operates in the 2.5–2.689 GHz frequency band, the MDS operates in the 2.15–2.162 GHz band, the WCS operates in the 2.345–2.36 GHz frequency band, and the LDMS operates in the 27,5–28,35 GHz frequency band. However, the exemplary embodiment is not limited to these frequencies, and other frequencies could also be used for downstream and upstream transmission. Further, the downstream communication path 196 may employ a Coded Orthogonal Frequency Division Multiplexing ("COFDM") modulation scheme or a Vector Orthogonal Frequency Division Multiplexing ("VOFDM") modulation scheme for modulation of downstream path signals. However, other modulation schemes could also be used on the downstream path, such as QPSK or QAM that may also be employed for upstream transmission on the upstream transmission path 198. Additionally, to increase the robustness against the multipath, five different symbol rate schemes (160, 320, 640, 1280, 2560) may be used on the upstream transmission path 198. However, different symbol rate schemes could also be used.

It should be understood that the exemplary system architecture 150 in FIG. 3 is not limited to the illustrated network devices, and more, fewer or different components or connections could also be used. Further, those skilled in the art will appreciate that other arrangements and other elements, such as interfaces or functions, whether or not known in the art, can be used instead, and some elements may be omitted altogether.

FIG. 4 is a block diagram illustrating an alternative system 200 that may be employed to offer a more robust downstream and upstream performance in a fixed wireless, cable or satellite plant having multipath distortions and signal reflections. Similarly, to the system illustrated in FIG. 3, the system 200 includes a customer site 202 having the CPE 18, the CM 16, a transceiver 204 with one or more antennas 206. The system 200 further illustrates a headend site including a cable access router 224, the Ethernet Interface 182, the modulator 178, and a transmit antenna 248. FIG. 4 illustrates an alternative configuration of the URCs. As shown in the system 200, the CMTS 12 includes a plurality of URCs 216, 218 and 220. In the embodiment shown in FIG. 4, a single URC is arranged to receive one of a plurality upstream frequencies available to the CM 16, and each URC is associated with two receive antennas. As illustrated in FIG. 4, the URC 216 is associated with receive antennas 236, 238, the URC 218 is associated with receive antennas 240, 242, and the URC 220 is associated with receive antennas 244, 246. However, the exemplary embodiment is not limited to each URC having two receive antennas, and more than two antennas could also be used.

Similarly to FIG. 3, the exemplary system 200 is not limited to the illustrated network devices, and fewer, more, different or equivalent network devices could also be used. Further, as in most communications applications, those skilled in the art will appreciate that many of the elements described herein are functional entities that may be implemented as discrete components or in conjunction with other components, in any suitable combination and location.

In the DOCSIS environment, an upstream channel is typically modeled as a stream of mini-slots, and a CMTS generates a time reference for identifying the slots and further controls access to the assigned slots by cable modems. A basic mechanism for assigning bandwidth includes an allocation MAP. The allocation MAP is a MAC management message transmitted by a CMTS on a downstream channel, which describes, for some interval, the functionality of each upstream mini-slot. A given MAP may define, for example, some slots as grants for data transmission by a particular CM, other slots as available for contention transmission, and other slots as an opportunity for new CMs to join the communication link. There is no predetermined number of mini-slots that should be used in MAP management messages, and the number of mini-slots typically varies. At minimum, a MAP may describe a single mini-slot; however, such an embodiment would be wasteful in both downstream bandwidth and in processing time within the CMs. At maximum, a MAP may stretch to tens of milliseconds; however, such a MAP would provide poor upstream latency. In the DOCSIS environment, a CMTS transmits one or more MAPs to a CM, and based on timing schemes specified in the MAPs, the CM generates data bursts at appropriate times conveyed in the mini-slot grants defined in the received MAP. Further, using the generated MAP a receiver on the CMTS has the ability to predict when to expect data bursts from the CM.

According to an exemplary embodiment, one implementation of the URCs illustrated in FIG. 3 or FIG. 4 includes a master/slave URC topology. In such an embodiment, one of the URCs is implemented as a master URC and generates a master MAP for the remaining URCs employed in the system. In such an embodiment, since all URCs have the same timing pattern, all URCs listen for data bursts from the CM 16 according to a predetermined time pattern specified in the master MAP. Further, the master URC provides a single master MAP to the CM 16 so that the CM 16 transmits data bursts based on the time pattern specified in the master MAP. Thus, according to an exemplary embodiment, the CM 16 uses the same master MAP for transmission of data bursts on each frequency available to the CM 16 for upstream data transmission, and all URCs at the headend listen for data burst transmission from the CM 16 using the same master MAP.

FIG. 5 is a flow chart illustrating a method 250 for configuring upstream receiver cards associated with a headend network entity according to an exemplary embodiment. At step 252, a plurality of upstream frequencies is allocated for use on a network device. In one embodiment associated with the systems described in reference to FIGS. 3 and 4, the upstream frequencies include wireless system frequencies.

At step 254, a plurality of upstream receiver cards at the headend network entity is configured to receive the upstream frequencies allocated to the network device. In one embodiment, each upstream receiver card is configured to receive one of the upstream frequencies allocated to the network device. For example, if two upstream frequencies are allocated for use on the network device, each upstream receiver card is configured to receive the two upstream frequencies allocated to the network device. In an alternative embodiment, two receiver arrays may be implemented to have two upstream receiver cards each, and the two upstream receiver cards in each array may be configured to receive the two frequencies allocated to the network device. Thus, a first upstream receiver card in a first receiver array may be configured to receive a first upstream frequency allocated to the network device, and a second upstream receiver card in the first receiver array may be configured to receive a second upstream frequency allocated to the network device. The same arrangement may be applied to the second receiver array.

At step 256, at least two receive antennas are provided for each upstream receiver card. In the embodiment where each upstream receiver card is configured to receive a different upstream frequency allocated to the network device, each upstream receiver card is configured to receive upstream transmission from the network device via at least two antennas. Such a configuration has been described in reference to FIG. 4. However, in the upstream receiver array configuration having at least two upstream receiver arrays, each upstream receiver array is configured to employ at least one antenna. Such a configuration has been described in reference to FIG. 3.

At step 258, one of the upstream receiver cards is configured as a master upstream receiver card. In one embodiment, the master upstream receiver card is configured to generate a master time reference for the remaining upstream receiver cards employed in the system, as well as for the network device associated with the allocated set of available upstream frequencies. For example, the timing reference generated on the master upstream receiver card may include a bandwidth MAP with a predetermined timing pattern for data transmission by the network device. However, the exemplary embodiment is not limited to using the MAP, and different or equivalent timing schemes could also be used.

At step 260, the master upstream receiver card generates a master time reference. At step 262, the master upstream receiver card provides the generated master time reference to the remaining upstream receiver cards employed in the system.

According to the exemplary method 250, the network device is the CM 16, and the headend network device includes the CMTS 12 having a plurality of upstream receiver cards. In one embodiment, the upstream receiver cards could include, for example, the upstream receiver cards 216, 218 or 220 having at least two antennas, as illustrated in FIG. 4. Alternatively, in the upstream receiver card array configuration, the upstream receiver arrays could include, for example, the upstream receiver arrays 158 and 160, each having at least one antenna, as illustrated in FIG. 3. However, different embodiments are possible as well, and fewer, more, different or equivalent network entities could also be used.

In one embodiment, the CM 16 is a standard DOCSIS compliant CM, however, in order to synchronize the CM 16 and the CMTS 12 to a predetermined form of an extended superchannel having more than one upstream frequency available to the CM 16, the CM 16 is initialized with a predetermined set of configuration parameters.

FIG. 6 is a flow chart illustrating a method 300 for initializing a network device in a network system having a multi-frequency upstream channel according to one exemplary embodiment. At step 302, a first network device acquires one or more downstream channels. In one embodiment, the first network device includes a non-volatile storage that stores last session operational parameters associated with a predetermined downstream channel. In such an embodiment, the first network device may attempt to re-acquire the previous operational parameters by trying to scan for the same downstream channel. If this fails, the first network device starts to continuously scan the downstream channels of the downstream frequency band until it finds a valid downstream channel. In one embodiment, a downstream channel is considered to be a valid channel when the first network device synchronizes to a predetermined symbol timing such as the QAM symbol timing, a predetermined framing such as FEC framing, or a predetermined packetization such as Moving Picture Experts Group ("MPEG") packetization. Further, to synchronize to a predetermined channel, the first network device receives a time synchronization message from a second network device.

At step 304, once the first network device is synchronized to a predetermined downstream channel, the first network device receives an upstream channel descriptor message from the second network device. The upstream channel descriptor message includes a set of transmission parameters for a possible upstream channel. When the first network device receives the upstream channel descriptor message, the first network device determines whether it can use the upstream channel parameters specified in the message. If the channel is suitable, the first network device extracts the parameters from the upstream channel descriptor message.

According to an exemplary embodiment, the upstream channel descriptor message received on the first network device includes at least two upstream frequencies that the first network device may use for upstream transmission. Further, the upstream channel descriptor message includes a frequency hopping descriptor defining, for example, one of many existing or later developed round-robin algorithms. Alternatively, the frequency hopping descriptor may include one or more time periods, such as time-of-day periods, that may define a plurality of time intervals during which a predetermined frequency should be used. For example, if an upstream channel specified in the received message includes five upstream frequencies, one of the time-of-days interval may specify that the first two frequencies should be used between 8 a.m. and 8 p.m., and a second time interval may specify that the rest of the frequencies should be used at the remaining time. Further, the time-of-day intervals may specify that some of the frequencies should be excluded from the use on the first network device at predetermined time intervals. However, the exemplary embodiment is not limited to the round-robin algorithm or the time-of-day mechanism, and different time scheduling mechanisms could also be used for frequency hopping on the first network device. In one embodiment, one of the upstream frequencies may be defined as a primary upstream frequency that may be used as a default upstream frequency. Further, according to one embodiment, when the first network device receives the first UCD defining more than one upstream frequency, the first network device may receive upstream channel descriptor messages for each of the plurality of upstream frequencies specified in the received upstream channel descriptor message.

At step 306, the first network device receives a second message from the second network device. The second message defines a transmission time descriptor for upstream transmission frequencies specified in the upstream channel descriptor message. The transmission time descriptor includes a timing pattern for sending data from the first network device. For example, in one embodiment, the second message may include a single bandwidth MAP for the plurality of upstream frequencies specified at step 304. The MAP may define a predetermined time pattern using for example, a mini-slot time representation and may be generated by one of the upstream receiver cards configured as a master card.

At step 308, the first network device generates a ranging request on a master upstream frequency specified in the upstream channel descriptor message received from the second network device. During the ranging process, the first network device may acquire a correct time offset such that the first network device's transmission is aligned to a correct boundary of one of the mini-slots specified in the MAP. Further, during the ranging process, the first network device may receive network delay information and power adjustment data.

At step 310, the first network device sends the ranging request message to the second network device. In one embodiment, the bandwidth MAP may define one of the time slots as an initial maintenance region, and the first network device may use the initial maintenance region to send the ranging request messages. However, different embodiments are possible as well.

At step 312, the first network device receives ranging adjustment parameters from the second network device and the first network device stores the ranging adjustment parameters for a future use. In one embodiment, the ranging adjustment parameters may include power adjustment information, offset frequency adjustment information, and any timing offset corrections. However, the exemplary embodiment is not limited to such ranging adjustment information, and different ranging adjustment parameters could also be specified.

At step 314, the first network device determines whether the ranging process has been applied to all upstream transmission frequencies available on the first network device. If the ranging process has not been applied to each available upstream frequency, at step 316, the first network device determines a next upstream frequency for which the ranging process should be applied. In one embodiment, if the frequency hopping descriptor received in the upstream channel descriptor message is associated with a predetermined frequency hopping algorithm, the first network device invokes the predetermine frequency hopping algorithm to determine the next upstream frequency. Once the first network device determines the next upstream frequency, the method continues at steps 310, 312, 314, and 316. In one embodiment, the first network device may apply a unicast ranging to all remaining upstream frequencies that are available to the first network device. Once the first network device determines that the ranging process has been applied to all of the available upstream frequencies, the method 300 terminates.

In the method 300, the first network device is the CM 16, and the second network device is the CMTS 12, illustrated in FIG. 3 or FIG. 4. However, the exemplary method is not limited to these network devices, and fewer, more, different, or equivalent network devices could also be used.

FIG. 7 is a flow chart illustrating an exemplary method for providing configuration parameters to a network device in a network system having a multi-frequency upstream channel according to an exemplary embodiment. At step 352, a second network device detects acquisition attempts of a downstream channel by a first network device. According to one embodiment, when the second network device detects the acquisition attempts of the downstream channel by the first network device, the second network device sends a synchronization message to the first network device. For example, the synchronization message establishes a MAC sublayer timing.

At step 354, the second network device generates an upstream channel descriptor message for the first network device. According to one embodiment, the upstream channel descriptor generated on the second network device includes a plurality of upstream frequencies that may be employed by the first network device for upstream data transmission. Further, the upstream channel descriptor message defines a frequency hopping descriptor that may be used on the first network device to determine an upstream frequency pattern that should be used for upstream data transmission. For example, the frequency hopping descriptor may define a frequency-hopping algorithm, such as a round-robin algorithm that may be used on the first network device to determine an upstream frequency transmission pattern. Further, the frequency hopping descriptor may include time intervals associated with one or more frequencies. For example, one of such time intervals could define a time interval during which one or more available upstream frequencies should not be employed for upstream transmission on the first network device. However, the frequency-hopping descriptor is not limited to the frequency-hopping algorithms, time interval patterns, or a combination thereof, and different means could be used to define a predetermined frequency-hopping pattern.

At step 356, the second network device sends to the first network device a second message defining a transmission time descriptor for upstream transmission frequencies that were specified in the upstream channel descriptor message. The transmission time descriptor generated on the second network device includes a timing pattern that may be used on the first network device for upstream transmission. For example, a predetermined network entity on the second network device may generate a bandwidth MAP that defines the timing pattern for the first network device.

At step 360, the second network device determines whether a ranging request has been received from the first network device and, if the request has not been received, the second network device may keep monitoring whether the ranging request has been received. In one embodiment, the first ranging request received from the first network device may include a broadcast ranging request associated with a master upstream frequency specified in the upstream channel descriptor message. Broadcast ranging requests may collide with other messages on a transmission path to the second network device. According to an exemplary embodiment, once the second network device receives the first ranging request message from the first network device, at step 362, the second network device provides unicast ranging opportunities for the remaining upstream frequencies available to the first network device.

At step 364, the second network device provides ranging adjustment parameters to the first network device. According to an exemplary embodiment, the upstream channel descriptor message includes the plurality of upstream transmission frequencies available to the first network device, and the first network device sends ranging requests for all or some of those frequencies to the second network device. Thus, the second network device provides ranging adjustment parameters each time it receives a ranging request from the first network device. The ranging adjustment parameters may include power adjustment data, offset frequency data, or timing offset corrections. However, the ranging adjustment parameters are not limited to those parameters, and different adjustment parameters could also be used.

In the method 350, the first network device is the CM 16, the second network device is the CMTS 12, and the network entity arranged to generate the timing reference is a master URCs in the systems illustrated in FIG. 3 or FIG. 4. However, the exemplary embodiment is not limited to these network devices, and fewer, more, different, or equivalent network devices could also be used.

Referring back to FIGS. 6 and 7, the CMTS 12 assigns a plurality of upstream transmission frequencies for the upstream transmission from the CM 16, and in order to enable the CM 16 to have the knowledge of the available upstream frequencies, the CMTS 12 generates an upstream channel descriptor message that defines the available upstream frequencies. In the DOCSIS environment, a typical upstream channel descriptor message includes a plurality of fields such as a configuration change count field, an upstream channel ID field, a downstream channel ID field, and additional parameters encoded as type-length-value ("TLV") tuples. For example, the TLV tuples may include TLV-encoded parameters of the upstream channel, TLV-encoded burst descriptor defining burst attributes such as a modulation type or a maximum burst size. According to an exemplary embodiment, the TLV-encoded parameters associated with the upstream channel include a set of new TLV-encoded tuples that define available upstream frequencies for the CM 16. Table 2 illustrates an exemplary 43/100 TLV tuple that may be used to define one of the available upstream frequencies in an upstream channel descriptor message.

TABLE 2

| Type | Length | VIDtype | vIDlen | VID | Sub-type | Length | Value |
|------|--------|---------|--------|-----|----------|--------|-------|
| 43 | 11 | 8 | 3 | 1 | 100 | 4 | Available Upstream Center Frequency |

Table 2 illustrates only one TLV tuple for a single upstream frequency. However, according to an exemplary embodiment, the upstream super channel includes more than one upstream frequency available to the CM 16. Thus, according to the exemplary embodiment, an upstream channel descriptor message includes more than one TLV tuples, and each TLV tuple defines an upstream frequency available to the CM 16 for upstream transmission. The TLV illustrated in Table 2 may be classified as a vendor specific TLV with a vendor identifier specified by VIDtype, vIDlen, and VID. Thus, it should be understood that the present invention is not limited to the values specified in Table 2, and different values, depending on a vendor implementation could also be used. Further, the present invention is not limited to using the vendor specific TLV for defining available frequencies, and a new TLV type could also be defined. Therefore, it should be understood that the TLV illustrated in Table 2 is only an exemplary TLV, and TLVs having more or fewer fields could also be used.

Further, according to an exemplary embodiment, the upstream channel descriptor message includes a TLV tuple with a frequency hopping descriptor that should be used on the CM 16 for frequency hopping on the available upstream frequencies. For example, one or more frequency-hopping algorithm may be available on the CM 16, and the frequency hopping descriptor tuple may include an identifier associated with a predetermined hopping algorithm. Therefore, when the CM 16 receives the upstream channel descriptor message with a predetermined frequency hopping algorithm identifier, the CM 16 may provision the frequency-hopping algorithm associated with the received frequency hopping identifier. Table 3 illustrates an exemplary 43/101 TLV tuple that may be used to define a frequency hopping descriptor in an upstream channel descriptor message. However, it should be understood that the TLV illustrated in Table 2 is only an exemplary TLV, and TLVs having more or fewer fields could also be used.

TABLE 3

| Type | Length | VIDtype | vIDlen | vID | Sub-type | Length | Value |
|------|--------|---------|--------|-----|----------|--------|-------|
| 43 | 11 | 8 | 3 | 1 | 101 | 4 | Frequency Hopping Descriptor |

Once the CM 16 initializes its internal parameters to the configuration parameters received from the CMTS 12 in an upstream channel descriptor message, and further completes a ranging process on all or some upstream transmission frequencies specified in the upstream channel descriptor message, the CM 16 may establish IP connectivity. In the DOCSIS environment, the CM 16 may invoke DHCP mechanisms to obtain an IP address and any other parameters needed to obtain IP connectivity and configuration parameters. Further, the CMTS 12 and the CM 16 need to have the current date and time for time-stamping logged events, which can be to retrieved by a management system. In one embodiment, the CM 16 may establish the time of day using one of the known or later developed protocols. For example, the CM 16 may establish the time of day using a protocol defined in the RFC-868. However, different protocols could also be used. Once the CM 16 is initialized and obtains configuration parameters, the CM 16 obtains an authorization to forward data into the network. In one embodiment, the CMTS 12 provides authorizations to the CM 16 via a registration process.

FIG. 8 is a flow chart illustrating an exemplary method 400 for registering and sending data from a network device according to an exemplary embodiment. At step 402, a first network device retrieves a predetermined frequency-hopping algorithm based on a frequency hopping descriptor received in an upstream channel descriptor message from a second network device. In addition to the frequency-hopping algorithm, the first network device invokes ranging adjustment parameters received from the second network device during a ranging process.

At step 404, the first network device determines an upstream transmission frequency for upstream data transmission using the retrieved frequency-hopping algorithm. Further, the first network device determines how to adjust a transmission power, and the upstream transmission frequency using the invoked ranging adjustment parameters associated with the upstream transmission frequency.

At step 406, the first network device registers with the second network device on the upstream frequency determined at step 404. In one embodiment, the first network device may generate a registration request message to register with the second network device on the upstream transmission frequency that has been determined using the frequency-hopping algorithm. In the DOCSIS environment, prior to the registration with the second network device, the first network device may initiate a trivial file transfer protocol exchange process with a predetermined network server to obtain a configuration file. In such an embodiment, the registration request message may include a plurality of TLV encoded parameters, some of which are set by the first network device according to the configuration file. In one embodiment, to register with the second network device, the first network device may generate a registration request message including a plurality of configuration settings, some of which are configuration file settings, and some are generated on the first network device. In response to a receipt of the registration request message, the second network device may generate a registration response message to confirm a successful/unsuccessful registration process.

At step 408, the first network device sends data using the upstream frequency. In one embodiment, the first network device may send data to a network entity located on an external data network. In such an embodiment, the first network device sends the data to the second network device that in turn forwards the data to the network entity located on the external data network.

According to an exemplary embodiment, the first network device may be configured to invoke a frequency hopping algorithm and determine an upstream transmission frequency prior to sending each data burst. In such an embodiment, at step 410, the first network device determines whether a current time interval corresponds to a transmission time interval. If so, at step 412, the first network device applies the frequency-hopping algorithm to determine a next upstream frequency for upstream frequency transmission. In one embodiment, the frequency-hopping algorithm may specify a predetermined frequency pattern. For example, the upstream channel descriptor message may specify three upstream frequencies, such as $f_1$, $f_2$, and $f_3$ that should be used on the first network device for upstream data transmission. Further, the frequency-hopping algorithm may define a transmission pattern for upstream data transmission on each transmission burst from the first network device. For example, the transmission pattern for the three frequencies may include a repeating transmission pattern: $f_1$, $f_1$, $f_1$, $f_2$, $f_2$, $f_3$, according to which the first network device may determine the next upstream transmission frequency for each transmission burst. Thus, in such an embodiment, the new upstream frequency for the second transmission burst from the first network device is the same upstream transmission frequency that was used on the first network device during the previous transmission burst. In another embodiment, the new upstream transmission frequency may be a different upstream frequency than the one used during the previous transmission burst. Referring back to the exemplary transmission pattern, when the first network device transmits upstream data during the fourth transmission burst, the first network device uses a different upstream transmission frequency than the one used during the first three consecutive transmission bursts. However, the exemplary method 400 is not limited to such repeating transmission pattern, and the upstream frequency descriptor message may define more or fewer upstream transmission frequencies, and the frequency-hopping algorithm may be associated with different transmission patterns than the exemplary transmission pattern.

According to the exemplary method 400, the first network device is the CM 16, and the second network device is the CMTS 12, employed in systems such as those shown in FIG. 3 or FIG. 4, for example. However, the exemplary method is not limited to those network devices, and fewer, more, different, or equivalent network devices could also be used to execute the method 400.

FIG. 9 are a flow chart illustrating an exemplary method 450 for changing upstream transmission frequencies on a multi-frequency upstream channel according to an exemplary embodiment. At step 452, a first network device determines an upstream transmission frequency using, for example, a frequency-hopping algorithm. According to an exemplary embodiment, when the first network device is initialized, the first network device receives an upstream channel descriptor message defining a plurality of upstream transmission frequencies available to the first network device for upstream data transmission, and a frequency-hopping descriptor associated with a predetermined frequency-hopping algorithm or a time-of-day pattern with time intervals during which each of the plurality upstream frequencies should be employed by the first network device. For example, the time pattern may specify one or more time intervals for each upstream transmission frequency, so that the first network device employs upstream transmission frequencies according to the specified time-of-day pattern. In one embodiment, more than one upstream transmission frequencies may be associated with the same time interval. In such an embodiment, the first network device may use the time-of-day pattern in combination with a frequency-hopping algorithm to determine upstream transmission frequencies in the time intervals associated with more than one upstream transmission frequencies. Further, according to an exemplary embodiment, the first network device receives a single bandwidth timing reference, such a single MAP, defining an upstream transmission scheme to be employed for any upstream frequency provided to the first network device.

At step 454, once the first network device determines an upstream transmission frequency using the frequency-hopping algorithm, a predetermined time pattern, or a combination thereof, the first network device sends upstream data using that upstream transmission frequency. According to an exemplary embodiment, the first network device may employ different upstream transmission frequencies during each transmission period (transmission burst) from the first network device. In such an embodiment, at step 456, the first network device determines whether a next transmission period has been reached. If so, at step 458, the first network device invokes, for example, the frequency-hopping algorithm to determine the next upstream transmission frequency. Once the next upstream transmission frequency is determined, at step 460, the first network device sends upstream data to the second network device using the determined upstream transmission frequency.

According to an exemplary embodiment, the second network device monitors frequency distortions of an upstream transmission frequency employed on the first network device for upstream data transmission. In one embodiment, if the frequency distortions associated with one or more upstream transmission frequencies available to the first network device exceed some predetermined level, the second network device may send a new upstream channel descriptor message to the first network device. For example, the new upstream channel descriptor may eliminate the one or more upstream frequencies having the frequency distortion exceeding the predetermined level. Alternatively, the new upstream channel descriptor message may define a new frequency-hopping algorithm, according to which, the one or more upstream transmission frequencies associated with the worst distortions are used not as frequently as the upstream transmission frequencies associated with lower frequency distortions.

At step 462, the first network determines whether a new upstream channel descriptor message is received. If not, the method 450 continues at step 456, and the first network device determines next upstream transmission frequencies using the plurality of upstream frequencies available to the first network device and the frequency-hopping algorithm associated with the available frequencies.

If the first network device receives a new upstream channel descriptor message from the second network device, at step 464, the first network device employs upstream transmission frequencies and a frequency-hopping algorithm or a frequency time pattern specified in the new message to determine upstream transmission frequencies for upstream data transmission from the first network device.

According to the exemplary method 450, the first network device is the CM 16, the second network device is the CMTS 12, and the computer network is a wireless network such as the wireless network illustrated in FIG. 4 or FIG. 5. However, the exemplary method 450 is not limited to these network devices, and fewer, more, different, or equivalent network devices could also be used. Further, the exemplary method 450 is not limited to the wireless networks, and it could be applied in a different type of network, such as a satellite network or a data-over-cable network.

Figure 10B:
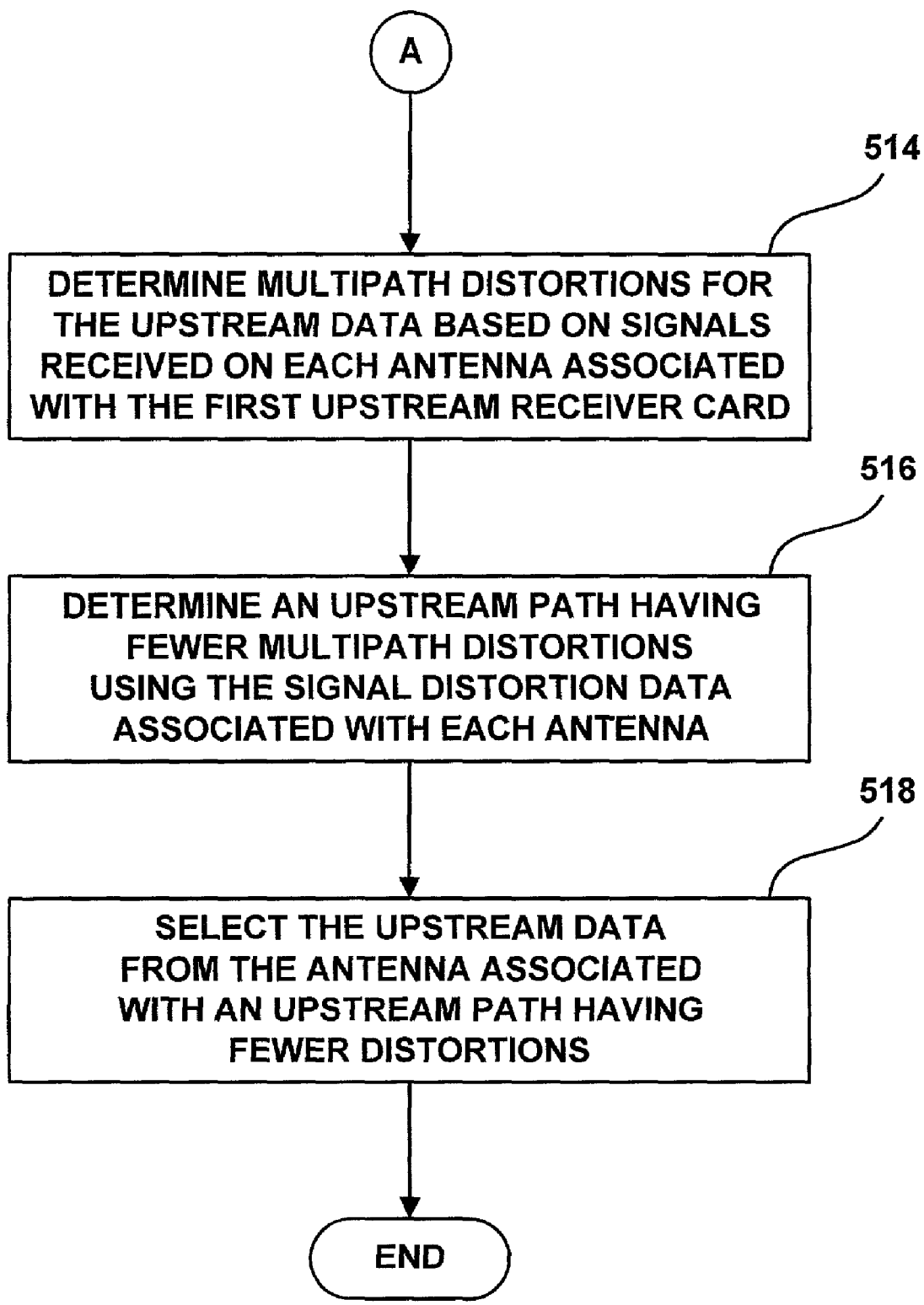

FIGS. 10A and 10B are a flow chart illustrating an exemplary method 500 for managing upstream frequencies available to a network device in a computer system, such as the wireless system 200 illustrated in FIG. 4. At step 502, a second network device monitors timing schedule for receiving upstream data from a first network device. In one embodiment, the second network device is associated with a plurality of upstream receiver cards for receiving upstream data from a first network device. In the embodiment illustrated in FIG. 4, each upstream receiver card is configured to receive one of the predetermined upstream frequencies assigned to the first network device, and each upstream receiver card has at least two receive antennas. As mentioned in reference to FIG. 4, the upstream receiver cards associated with the second network device may be configured using a master-slave configuration method. In such an embodiment, one of the upstream receiver cards is configured as a master upstream receiver card that generates a master timing schedule reference, such as the bandwidth MAP, and provides it to slave upstream receiver cards and the first network device. In such an embodiment, all upstream receiver cards are configured to listen for upstream transmission from the first network device according to the same timing schedule. Further, the first network device receives only a single MAP for a plurality of upstream frequencies available for upstream transmission from the first network device.

At step 504, the upstream receiver cards use the timing schedule to determine whether a time period corresponds to one of the transmission time periods. If, according to the timing schedule, a current time interval corresponds to one of time intervals for receiving upstream transmission from the first network device, at step 506, the upstream receiver cards are set for receiving upstream transmission from the first network device. If the current time interval does not correspond to one of the timing schedule intervals for receiving data transmission from the first network device, the upstream receiver cards keep using the timing schedule to determine the next upstream transmission interval.

At step 508, the upstream transmission is picked up on a first upstream receiver cards on the second network device. According to an exemplary embodiment, the first network device transmits the upstream data on one of the available upstream frequencies, and an upstream receiver card arranged to receive data on that upstream frequency receives the transmitted data. Further, according to the exemplary embodiment, the first upstream receiver card is associated with at least two receive antennas for receiving upstream transmission from the first network device, so that the upstream transmission from the first network device is picked up at the at least two receive antennas.

At step 510, the first upstream receiver card determines whether the upstream frequency that has been employed by the first network device for sending upstream data is impaired. In one embodiment, the first upstream receiver card may determine an error associated with the received upstream frequency and, further, may determine whether the determined error is higher than a predetermined acceptable frequency error. If the upstream frequency is impaired beyond the acceptable level, at step 512, the second network device may send a new upstream channel descriptor message to the first network device. For example, based on the new upstream channel descriptor message, the first network device may either stop the usage of the impaired upstream frequency, or may use it less frequently based on a new frequency-hopping algorithm specified in the upstream channel descriptor message.

Referring back to step 510 in FIG. 10A, if the upstream frequency associated with the upstream transmission received on the first upstream receiver card is not distorted above the predetermined distortion level, at step 514, the first upstream receiver card determines multipath distortions associated with the received upstream transmission signals. According to an exemplary embodiment, the first upstream receiver card is associated with at least two receive antennas that pick up upstream transmission from the first network device. Therefore, upstream signals picked up at each antenna may differ since different signal reflections affect the signals received on each antenna.

At step 516, the first upstream receiver card determines an upstream transmission path having fewer distortions using the multipath distortion data associated with each receive antenna. At step 518, the upstream receiver card processes upstream data associated with the upstream transmission path having fewer distortions.

According to the exemplary method 500, the first network device is the CM 16, the second network device is the CMTS 12, and the first upstream receiver card associated with at least two antennas is one of the upstream receiver cards illustrated in FIG. 4. However, the exemplary method 500 is not limited to the upstream card configuration illustrated in FIG. 4, and it could also be applied in the upstream card array configuration illustrated in FIG. 3. In such an embodiment, the upstream transmission from the first network device is received on at least one receiver card in each of the upstream receiver card arrays 158 and 160. Further, the exemplary method 500 is not limited to these network devices, and fewer, more, different or equivalent network devices could also be used.

According to the present invention, the systems and methods for multi-frequency upstream channel reduce, for example, the probability of contiguous packet loss due to frequency fading, and improve the upper layer frequency performance, such as TCP or IP performance. According to the present implementations, the MMDS licensed channels are often shared with ITFS educational licensed channels to optimize upstream spectrum and upstream bandwidth. In one embodiment, operators could define one or more channels in the available upstream frequency spectrum for data transmission from a cable modem. In such an embodiment, when an URC receives upstream transmission on a current frequency channel, the URC may measure, for example, a bit error rate or a signal to noise ratio on the current channel. If one of these parameters crosses a predetermined threshold level associated with each examined parameter, the current frequency employed on the upstream channel may be excluded from the available upstream frequencies on the cable modem. In such an embodiment, a headend entity may send to the cable modem a message with a TLV defining the upstream channel exclusion code so that the impaired frequency is no longer used for upstream transmission from the cable modem. Such a message may define a new frequency to be used on the cable modem instead of the impaired frequency. Thus, the frequencies used on the cable modem may be controlled without any service disruptions or cable modem's re-registrations with the headend network entity.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein. Further, the exemplary methods are not limited to the wireless system, and the frequency hopping method could also be applied on downstream transmission links, such as downstream cable network links.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for providing a super upstream channel enabling network entities to transmit data on more than one upstream frequency may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

Further, the claims should not be read as limited to the described order or elements unless stated to that effect. Therefore, all embodiments that come within the scope and spirit of the following claims and equivalents thereto are claimed as the invention.

What is claimed:

1. A method for providing a multi-frequency upstream transmission path for a first network devices in a computer network, the method comprising:
   generating a first message on a second network device, the first message defining a plurality of upstream frequencies available for upstream transmission from the first network device, and further comprising, a frequency hopping descriptor for the plurality of upstream frequencies;
   sending the first message to the first network device via a downstream transmission link;
   generating a single timing reference for upstream transmission on the plurality of upstream frequencies from the first network device;
   sending the single timing reference to the first network device;
   receiving upstream transmission from the first network device according to a frequency hopping pattern determined on the first network device based on the frequency hopping descriptor, wherein the upstream transmission is received on a plurality of upstream receiver cards, each upstream receiver card associated with at least two receive antennas and configured to receive upstream transmission on one of the plurality of upstream frequencies according to the single timing reference;
   determining whether frequency distortions associated with each of the plurality of upstream frequencies exceed a predetermined distortion level; and, if so,
   sending a second message to the first network device, the second message comprising a new frequency hopping descriptor; and
   receiving upstream transmission from the first network device determined on the first network device based on the new frequency hopping descriptor received from the second network device.

2. A computer readable medium having stored therein instructions for causing a processor to execute the method of claim 1.

3. The method of claim 1, further comprising:
   determining an upstream transmission path having fewer multipath distortions for each upstream receiver card based on signal errors associated with signals received on each antenna of each upstream receiver card; and processing the upstream transmission from the upstream transmission path associated with the fewer multipath distortions.

4. The method of claim 1, wherein the first message comprises an upstream channel descriptor message comprising the plurality of upstream frequencies and the frequency hoping descriptor encoded in a type-length-value format, and the single timing reference comprises a single bandwidth MAP.

5. The method of claim 1, wherein the frequency hopping descriptor comprises a name of a frequency hopping algorithm for changing upstream frequencies on the first network device.

6. The method of claim 1, wherein the frequency hopping descriptor comprises a time of day pattern for changing upstream frequencies employed for upstream transmission from the first network device.

7. The method of claim 1, wherein the computer network comprises a fixed wireless network, a satellite network, or a data-over-cable network.

8. A system for managing upstream multi-frequency transmission in a computer network, the system comprising:
a headend network entity for providing a plurality of upstream frequencies for upstream data transmission from a network entity, and further for providing an upstream frequency hopping descriptor for determining an upstream frequency changing patter for upstream transmission from the network entity;
a plurality of upstream receiver cards associated with the headend network entity, wherein each upstream receiver card being configured to receive one of the plurality of upstream frequencies available for the upstream data transmission from the first network entity, wherein at least one of the plurality of upstream receiver cards is configured as a master upstream receiver card and is further configured to generate a master timing reference for the plurality of upstream receiver cards and the network entity;
at least two receive antennas associated with each upstream receiver card for receiving upstream data transmission from the first network device.

9. The system of claim 8, wherein the network entity comprises a cable modem, and the headend network entity comprises a cable modem termination system.

10. The system of claim 8, wherein each of the plurality of upstream receiver cards is configured to determine frequency distortions upon a receipt of upstream transmission from the network entity.

11. The system of claim 8, wherein each of the plurality of upstream receiver cards is configured to determine an upstream path associated with fewer multipath distortions for receiving upstream transmission from the network entity upon a receipt of upstream transmission from the network entity.

12. The system of claim 11, wherein each of the plurality of upstream receiver cards determine the upstream path associated with fewer multipath distortions based on signal distortions of the upstream transmission received on each of the at least two antennas associated with each of the plurality of upstream receiver cards.

13. The system of claim 8, wherein the master timing reference comprises a bandwidth MAP.

14. The system of claim 8, wherein the computer network comprises a fixed wireless network, a satellite network, or a data-over-cable network.

15. A method for providing a multi-frequency upstream transmission path to a cable modem in a computer network, the method comprising:
providing an upstream channel descriptor message from a cable modem termination system to the cable modem, the upstream channel descriptor message comprising a plurality of upstream transmission frequencies assigned for upstream transmission from the cable modem, and further comprising a frequency hopping descriptor for frequency hopping on the plurality of upstream transmission frequencies;
providing a single timing reference from the cable modem termination system to the cable modem;
determining a first upstream transmission frequency using the plurality of upstream transmission frequencies and a frequency hopping algorithm associated with the frequency hopping descriptor;
sending upstream data from the cable modem to the cable modem termination system on the first upstream transmission frequency based on the timing reference;
receiving the upstream data on a first upstream receiver card on the cable modem termination system, wherein the first upstream receiver card is associated with at least two receive antennas;
determining an upstream transmission path associated with fewer multipath distortions using the upstream data from each of the at least two receive antennas;
processing the upstream data from a receive antenna associated with the upstream transmission path associated with fewer multipath distortions; and
receiving upstream data from the cable modem on a second upstream transmission frequency, the second upstream transmission frequency comprising one of the plurality upstream transmission frequencies assigned for upstream transmission from the cable modem, the second upstream transmission frequency determined on the cable modem using the upstream frequency change pattern.

16. A computer readable medium having stored therein instructions for causing a processor to execute the method of claim 15.

17. The method of claim 15, wherein the computer network comprises a fixed wireless network, a satellite network, or a data-over-cable network.

18. A system for managing upstream transmission in a computer network, the system comprising:
a termination system for providing a plurality of upstream transmission frequencies for upstream transmission from a cable modem, and further providing a frequency hopping descriptor associated with a predetermined frequency hopping algorithm;
a plurality of upstream receiver cards associated with the cable modem termination system for receiving upstream transmission from the cable modem, each upstream receiver card associated with at least one upstream transmission frequency available on the cable modem, wherein at least one of the plurality of upstream receiver cards is configured as a master upstream receiver card and is further configured to generate a master timing reference for the plurality of upstream receiver cards and the cable modem; and
at least two receive antennas associated with each of the plurality of upstream receiver cards for receiving upstream transmission from the cable modem.

19. The system of claim 18, wherein each of the plurality of upstream receiver cards is configured to determine frequency distortions upon a receipt of upstream transmission from the cable modem and provide a new frequency hopping descriptor to the cable modem.

20. The system of claim 18, wherein the computer network comprises a wireless computer network.

21. The system of claim 18, wherein the timing reference comprises a bandwidth MAP.

22. A system for managing upstream transmission in a wireless network, the system comprising:
- a cable modem termination system for providing to a cable modem a plurality of upstream transmission frequencies and a frequency hopping identifier associated with a predetermined frequency hopping algorithm;
- at least two upstream receiver arrays, each upstream receiver array having a plurality of upstream receiver cards for receiving upstream transmission from the cable modem, the plurality of upstream receiver cards arranged to receive the plurality of upstream transmission frequencies associated with the cable modem, wherein at least one upstream receiver card is configured as a master upstream receiver card and is further configured to generate a master timing reference for the plurality of upstream receiver cards and the cable modem;
- at least one receive antenna associated with each of the at least two upstream receiver arrays for receiving upstream transmission from the cable modem; and
- the cable modem using the frequency hopping algorithm to determine upstream transmission frequencies based on the plurality of upstream transmission frequencies available to the cable modem.

* * * * *